United States Patent
Chang et al.

(10) Patent No.: US 8,758,499 B2
(45) Date of Patent: Jun. 24, 2014

(54) AQUEOUS SOLUTION FOR APPLYING TO A CHANNEL AND APPLYING METHOD

(75) Inventors: William W. P. Chang, Newark, CA (US); Yihshing Shih, San Mateo, CA (US)

(73) Assignee: Wako Pure Chemical Industries, Ltd., Osaka (JP)

( * ) Notice: Subject to any disclaimer, the term of this patent is extended or adjusted under 35 U.S.C. 154(b) by 645 days.

(21) Appl. No.: 12/934,636

(22) PCT Filed: Mar. 26, 2009

(86) PCT No.: PCT/US2009/001907
§ 371 (c)(1),
(2), (4) Date: Feb. 11, 2011

(87) PCT Pub. No.: WO2009/120363
PCT Pub. Date: Oct. 1, 2009

(65) Prior Publication Data
US 2011/0135819 A1    Jun. 9, 2011

Related U.S. Application Data

(60) Provisional application No. 61/039,720, filed on Mar. 26, 2008.

(51) Int. Cl.
*B05D 7/22*   (2006.01)

(52) U.S. Cl.
USPC ..................................... 106/287.14; 427/230

(58) Field of Classification Search
USPC ............ 427/230–239; 528/10–43; 106/287.1, 106/287.12, 287.13, 287.14, 287.15, 287.16
See application file for complete search history.

(56) References Cited

U.S. PATENT DOCUMENTS

| 4,657,959 | A | * | 4/1987 | Bryan et al. | .................. 524/266 |
| 4,774,297 | A | * | 9/1988 | Murakami et al. | ............ 525/478 |
| 5,830,970 | A | * | 11/1998 | Cobb et al. | ....................... 516/13 |
| 8,038,885 | B2 | * | 10/2011 | Schmidt et al. | ............... 210/639 |
| 2006/0057209 | A1 | * | 3/2006 | Chapman et al. | ............. 424/486 |

* cited by examiner

*Primary Examiner* — William Phillip Fletcher, III
(74) *Attorney, Agent, or Firm* — Finnegan, Henderson, Farabow, Garrett & Dunner, LLP

(57) ABSTRACT

An aqueous solution containing a buffer and an organosilicone surfactant and a method of applying an aqueous solution containing a buffer and an organosilicone surfactant to a channel are presented. The aqueous solution includes a buffer and an organosilicone surfactant and may also include a blocking agent. The method includes providing an aqueous solution containing a buffer and an organosilicone surfactant, and applying the aqueous solution to the channel having the hydrophobic surfaces. The organosilicone surfactant is used to reduce surface tensions of the solution on the hydrophobic channel. The organosilicone surfactant is combined with the blocking agent for preventing an interaction between the surface of the channel and a component in the aqueous solution.

25 Claims, 10 Drawing Sheets

AQUEOUS SOLUTION FOR APPLYING TO A CHANNEL AND APPLYING METHOD

RELATED APPLICATION

This application is the national stage of International Application No. PCT/US2009/001907, filed Mar. 26, 2009, which claims the benefit of U.S. Provisional Application No. 61/039,720, filed Mar. 26, 2008, which are both incorporated herein by reference.

DESCRIPTION OF THE INVENTION

1. Field of the Invention

The present invention is related to an aqueous solution containing a buffer and an organosilicone surfactant and a method of applying an aqueous solution containing a buffer and an organosilicone surfactant to a channel having hydrophobic surface in devices, particularly microfluidic devices, to prevent or minimize among others air bubble formation on hydrophobic surfaces.

2. Background of the Invention

A surfactant is an amphiphilic compound that has both a hydrophilic group, called the head, and a hydrophobic group, called the tail. The combination of hydrophilic and hydrophobic groups of surfactants allows this compound to be soluble in both water and organic solvents. Partly because of their amphiphilicity, organosilicone surfactants have been known to be good wetting agents, meaning that they improve spreading of aqueous media on hydrophobic surfaces when they are added in the aqueous media.

The use of organosilicone surfactants as wetting agents in clinical and analytical devices for immunoassay, enzyme assay or enzyme immunoassay, particularly microfluidic devices for such uses, has not been well known.

SUMMARY OF THE INVENTION

It was discovered by the inventors that a mixture of a certain class of organosilicone surfactants introduced in hydrophobic channels of a device promoted wettability of the channel surface and prevented or minimized bubbles from forming on the surface of the channels, particularly microfluidic channels.

A method of applying an aqueous solution to a microfluidic channel is provided. The aqueous solution includes a buffer and an organosilicone surfactant and may also include a blocking agent for preventing an interaction between the surface of the channel and a component in the aqueous solution.

The structure of an organosilicone surfactant in the mixture may be:

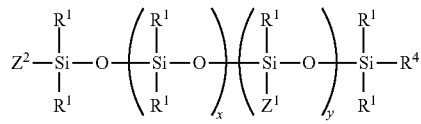

wherein $R^1$ individually is an alkyl group having 1 to 4 carbon atoms with or without an OH group, and $Z^1$ is a hydroxyalkyl group having 1 to 4 carbon atoms or a polyether group, $Z^2$ is an alkyl group having 1 to 4 carbon atoms with or without an OH group or a polyether group, $R^4$ is an alkyl group having 1 to 4 carbon atoms with or without an OH group or

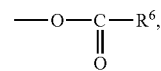

wherein $R^6$ is an alkyl group having 1 to 4 carbon atoms with or without an OH group, y is an integer equal to or greater than 1, and x is an integer equal to or greater than zero.

The structure of an organosilicone surfactant in the mixture may be:

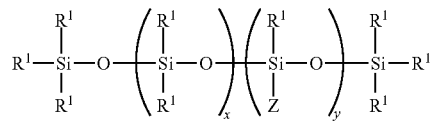

wherein $R^1$ individually is an alkyl group having 1 to 4 carbon atoms with or without an OH group, and Z is a polyether group, y is an integer equal to or greater than 1, and x is an integer equal to or greater than zero.

As an example, the organosilicone surfactant may be the formula of:

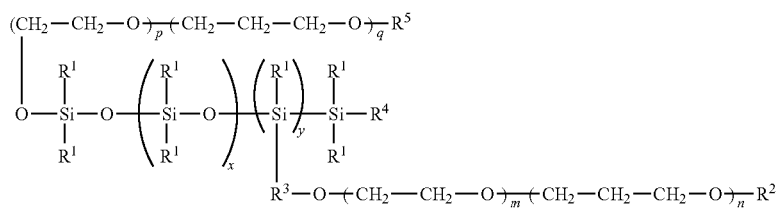

wherein $R^1$ individually is an alkyl group having 1 to 4 carbon atoms with or without an OH group, $R^2$ is an alkyl group, an acetyl group, a hydrogen atom, or an OH group, $R^3$ is an alkylene group, $R^5$ is a hydrogen atom or an alkyl group having 1 to 4 carbon atoms with or without an OH group, $R^4$ is an alkyl group having 1 to 4 carbon atoms with or without an OH group or

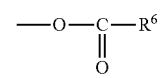

(wherein $R^6$ is an alkyl group having 1 to 4 carbon atoms with or without an OH group), y is an integer equal to or greater than 1, and x, m, n, p and q are independently an integer equal to or greater than zero.

Another example of an organosilicone surfactant may be the formulae [1] or [1-2] of:

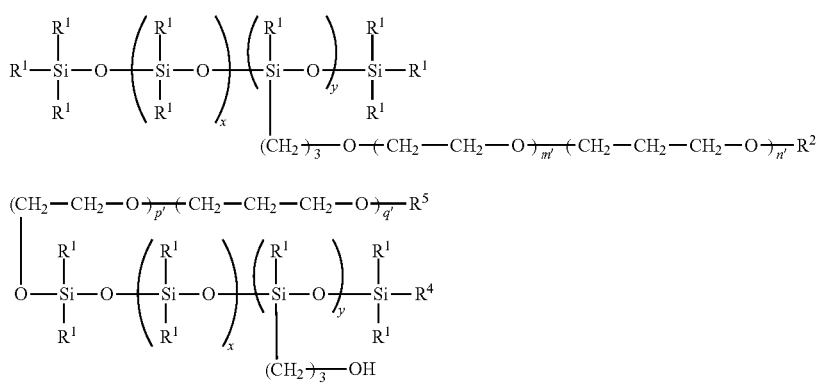

where $R^1$ individually is an alkyl group having 1 to 4 carbon atoms with or without an OH group, $R^2$ is an alkyl group having 1 to 4 carbon atoms, an acetyl group, a hydrogen atom, or an OH group, $R^5$ is a hydrogen atom or an alkyl group having 1 to 4 carbon atoms with or without an OH group, $R^4$ is an alkyl group having 1 to 4 carbon atoms with or without an OH group or

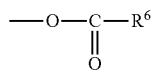

(wherein $R^6$ is an alkyl group having 1 to 4 carbon atoms with or without an OH group), wherein y, m' and p' are independently an integer equal to or greater than 1, and x, n' and q' are independently an integer equal to or greater than zero.

In a further example, $R^1$ may be $CH_3$. Also, n or n' may be zero so that the structure above contains ethylene oxide(s) and no propylene oxide. Furthermore, x may be zero and y may be one so that the structure becomes a trisiloxane compound. Moreover, x may range from 0 to 130, 0 to 40, 0 to 10, or 0 to 4; y may range from 1 to 40, 1 to 30, 1 to 20, or 1 to 4; m may range from 1 to 50, 2 to 30, 3 to 20, or 4 to 16; and n may range from 0 to 50, 0 to 25, 0 to 10, or 0 to 4.

The blocking agent for preventing an interaction between the surface of the channel and a component in the aqueous solution may be a poly(alkylene oxide) oligomer and/or poly-dimethylacrylamide (p-DMA).

The structure of the blocking agent—poly(alkylene oxide) oligomer—may be:

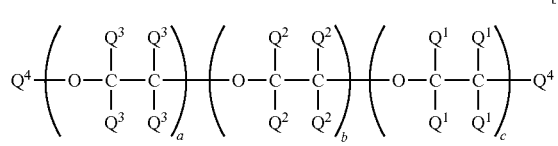

where each $Q^1$ independently is a hydrogen atom or an alkyl group having 1 to 4 carbon atoms, each $Q^2$ independently is a hydrogen atom or an alkyl group having 1 to 4 carbon atoms, each $Q^3$ independently is a hydrogen atom or an alkyl group having 1 to 4 carbon atoms, and each $Q^4$ independently is a hydrogen atom or an —OH group, wherein a, b, and c are independently an integer equal to or greater than 1. Each $Q^1$ independently may be a hydrogen atom, and each $Q^3$ independently may be a hydrogen atom. Furthermore, each $Q^1$ independently may be a hydrogen atom, each $Q^3$ independently may be a hydrogen atom, and three of $Q^2$ are a hydrogen atom and one of $Q^2$ is an alkyl group having 1 to 4 carbon atoms. Furthermore, "a" may range from 0 to 130 or 12 to 101; "b" may range from 0 to 100 or 2 to 56; and "c" may range from 0 to 130 or 12 to 101.

In another example, the blocking agent may be poly-dimethylacrylamide (p-DMA). A low to high molecular weight p-DMA may be added with a wetting agent.

The amount of the organosilicone surfactant can be 0.001 to 0.5 weight percent in an aqueous solution.

A blocking agent for preventing an interaction between the surface of the channel and a component in the aqueous solution may be additionally provided. Thus, the organosilicone surfactant is combined with the buffer and the blocking agent. The blocking agent may be contained in the aqueous solution having the buffer and the organosilicone surfactant or in other aqueous solution having no organosilicone surfactant. The length of the blocking agent is greater than the length of organosilicone surfactant when the molecules are extended.

A method of applying an aqueous solution to a microfluidic channel having hydrophobic surfaces is provided to reduce surface tensions of the solution on the hydrophobic channel, thereby increasing the wettability of the microfluidic channel. The solution, which contains organosilicone surfactant, may further contain a blocking agent to increase the performance of the organosilicone surfactant.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed. All references cited herein are incorporated by reference.

The accompanying drawings, which are incorporated in and constitute a part of this specification, illustrate one or more embodiments of the invention and together with the description, serve to explain the principles of the invention.

BRIEF DESCRIPTION OF THE DRAWINGS

In FIG. 1A, air bubbles prevent proper current conduction; in FIG. 1B, no air bubbles form and current conducts properly.

DESCRIPTION OF THE EMBODIMENTS

Figure 1A:
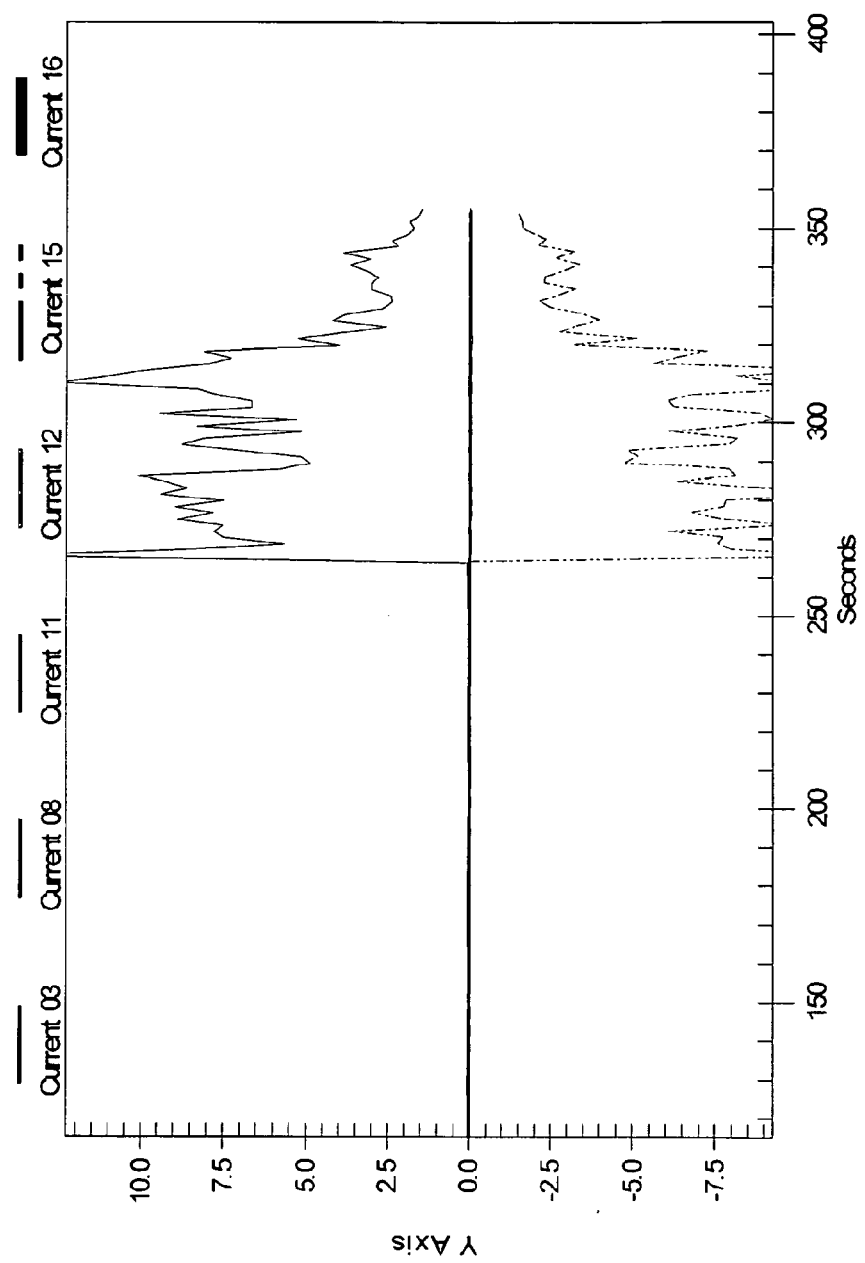
FIGS. 1A and 1B show current profiles when current is run through a microfluidic system.

Components of many devices including mircofluidic devices are made of hydrophobic plastics or polymeric materials such as polymethyl methacrylate (PMMA), cycloolefin polymer (COP), or cycloolefin copolymer (COC). While the usage of plastics has promoted interchangeability and disposability of the components, the hydrophobicity of plastics has introduced another problem when aqueous media is involved with, for example, assay methods. The hydrophobic surfaces in contact with aqueous media tend to promote formation of air bubbles on the surface, which can interfere with assays. For example, when aqueous reagents are filled into plastic microchannels of a microfluidic device, air bubbles are trapped in the channels which can lead to assay failure. The microchannels, which is defined to be about less than 1000 microns in depth or about less than 100 microns in depth, may be pre-filled with alcohol, such as isopropyl alcohol, by itself or with water before filing the channels with aqueous reagents under pressure to suppress forming or trapping air bubbles but this procedure necessarily complicates assay operation, consumes more time, and adds costs. Furthermore, introducing alcohol may contaminate the reagents and interfere with the assay results.

Organosilicone surfactants as wetting agents to spread aqueous reagents are found to be effective in preventing or minimizing formation of air bubbles in channels such as microfluidic channels with hydrophobic surfaces. The term, "organosilicone surfactants" or in the singular form, "an organosilicone surfactant" may refer to a single species or a distribution of organosilicone surfactants based on, for example, the weight average molecular weight. A channel as referred here could be a tubular enclosed passage within a material or a groove or a furrow on a surface of a material. Channels may include capillaries or narrow tubes. As an example, the depth of the channel may be approximately 1000 μm or less or approximately 100 μm or less, the inner diameter of the channel may be approximately 1 to 1000 μm, approximately 1 to 200 μm, or approximately 1 to 100 μm, and the length of the channel may be approximately 0.1 mm to 100 cm, approximately 0.1 mm to 20 cm, or approximately 0.1 mm to 10 cm. Organosilicone surfactants with a reagent or a sample may be directly filled into a channel without prepping it by pre-filing with alcohol. The organosilicone surfactants/reagent (sample) combination wets the hydrophobic surface of the channel to prevent bubbles from adhering to the surface or to release bubbles from the surface, and the resulting bubbles in the solution are flushed out of the channel into waste wells by, for example, an application of pressure. Compared to the pre-filling technique with alcohol, the direct filling of the organosilicone surfactant/reagent (sample) combination leads to reducing time and costs of running an assay.

The structure of an organosilicone surfactant in the mixture may be:

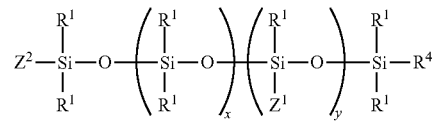

wherein $R^1$ individually is an alkyl group having 1 to 4 carbon atoms with or without an OH group, and $Z^1$ is a hydroxyalkyl group having 1 to 4 carbon atoms or a polyether group, $Z^2$ is an alkyl group having 1 to 4 carbon atoms with or without an OH group or a polyether group, $R^4$ is an alkyl group having 1 to 4 carbon atoms with or without an OH group or

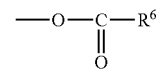

(wherein $R^6$ is an alkyl group having 1 to 4 carbon atoms with or without an OH group), y is an integer equal to or greater than 1, and x is an integer equal to or greater than zero.

The structure of an organosilicone surfactant in the mixture may be:

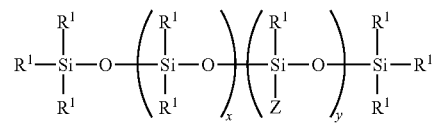

wherein $R^1$ individually is an alkyl group having 1 to 4 carbon atoms with or without an OH group, and Z is a polyether group, y is an integer equal to or greater than 1, and x is an integer equal to or greater than zero.

The polyether group represented by Z, $Z^1$ and $Z^2$ include a chain of repeat unit, wherein the chain of repeat unit includes at least one divalent group derived from an alkylene oxide monomer having 2 to 4 carbon atoms such as ethylene oxide, propylene oxide, butylene oxide, etc.

An example of the organosilicone surfactant that can be used has the structure as follows:

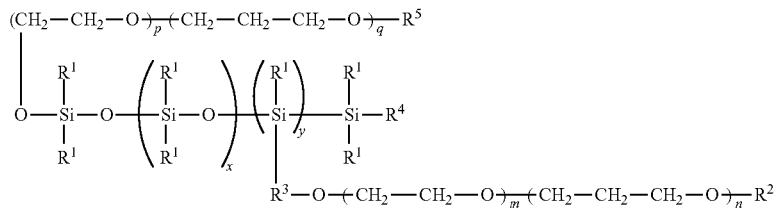

wherein $R^1$ individually is an alkyl group having 1 to 4 carbon atoms with or without an OH group, $R^2$ is an alkyl group, an acetyl group, a hydrogen atom, or an OH group, $R^3$ is an alkylene group, $R^5$ is a hydrogen atom or an alkyl group having 1 to 4 carbon atoms with or without an OH group, $R^4$ is an alkyl group having 1 to 4 carbon atoms with or without an OH group or

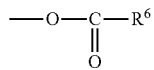

(wherein $R^6$ is an alkyl group having 1 to 4 carbon atoms with or without an OH group), y is an integer equal to or greater than 1, and x, m, n, p and q are independently an integer equal to or greater than zero.

The indices, m and p, independently are an integer equal to or greater than zero (0). Specifically, m may be, at a lower limit, 0 or more, 1 or more, 2 or more, 3 or more, or 4 or more, and at an upper limit, 50 or less, 30 or less, 20 or less, or 16 or less. p may be similarly defined.

The indices, n and q independently are an integer equal to or greater than zero (0). Specifically, n may be, at a lower limit, 0 (zero) or more, and at an upper limit, 50 or less, 25 or less, 10 or less, or 4 or less. The index, n, may be 0 (zero). The indices, m+n may be, at a lower limit, 1 or more, 2 or more, 3 or more, or 4 or more, and at an upper limit, 100 or less, 55 or less, 30 or less, or 16 or less. q and p+q may be similarly defined.

At least m, n, p and q are an integer equal to or greater than 1.

Another example of the organosilicone surfactant that can be used has the structure as follows:

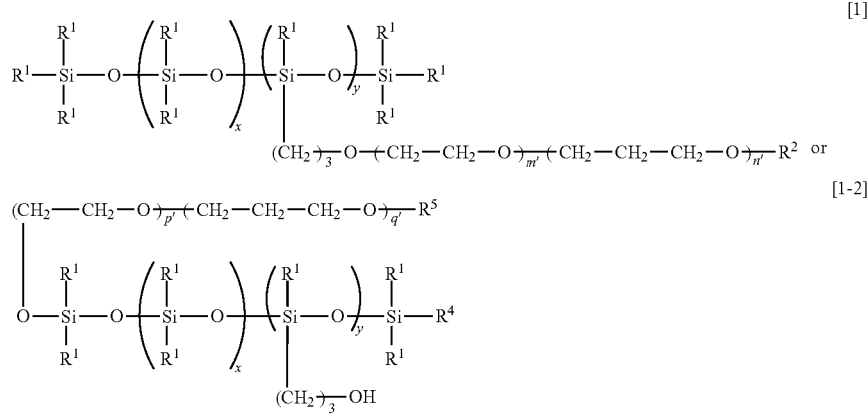

An alkylene group represented by $R^3$ includes a group having 1 to 4 carbon atoms, and includes, for example, a methylene group, an ethylene group, a trimethylene group, a tetramethylene group, an ethylidene group, a propylidene group, isopropylidene group, a methylmethylene group, a methylethylene group, an ethylmethylene group, a buthylene group, a methylpropylene group, an ethylethylene group, etc.

$R^3$ in the formula may be a trimethylene group.

The index, x, is an integer equal to or greater than zero (0). Specifically, x may be, at a lower limit, 0 (zero) or more, and at an upper limit, 130 or less, 40 or less, 10 or less, or 4 or less. X may be 0 (zero).

The index, y, is an integer equal to or greater than 1. Specifically, y may be, at a lower limit, 1 or more, and at an upper limit, 40 or less, 30 or less, 20 or less, or 4 or less. Y may be 1.

The indices, x+y may be, at a lower limit, 1 or more, and at an upper limit, 170 or less, 70 or less, 30 or less, or 8 or less.

where $R^1$ individually is an alkyl group having 1 to 4 carbon atoms with or without an OH group, $R^2$ is an alkyl group having 1 to 4 carbon atoms, an acetyl group, a hydrogen atom, or an OH group, $R^5$ is a hydrogen atom or an alkyl group having 1 to 4 carbon atoms with or without an OH group, $R^4$ is an alkyl group having 1 to 4 carbon atoms with or without an OH group or

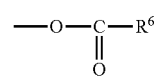

(wherein $R^6$ is an alkyl group having 1 to 4 carbon atoms with or without an OH group), wherein y, m' and p' are independently an integer equal to or greater than 1, and x, n' and q' are independently an integer equal to or greater than zero.

An alkyl group having 1 to 4 carbon atoms represented by $R^1, R^2, R^4, R^5, R^6$ and $Z^2$ and an alkyl group of a hydroxyalkyl group represented by $Z$ and $Z^1$ in the above formulae may be straight chain or branched, or may be a straight chain and includes a group having 1 to 2 carbon atoms, and includes, for example, a methyl group, an ethyl group, an n-propyl group, an isopropyl group, an n-butyl group, an isobutyl group, a sec-butyl group, and a tert-butyl group.

$R^1$ may be a methyl group.

$R^2$ and $R^5$ may be a methyl group, a hydrogen atom or an acetyl group, or may be an OH group.

The index, x, is an integer equal to or greater than zero (0). Specifically, x may be, at a lower limit, 0 (zero) or more, and at an upper limit, 130 or less, 40 or less, 10 or less, or 4 or less. X may be 0 (zero).

The index, y, is an integer equal to or greater than 1. Specifically, y may be, at a lower limit, 1 or more, and at an upper limit, 40 or less, 30 or less, 20 or less, or 4 or less. Y may be 1.

The indices, x+y may be, at a lower limit, 1 or more, and at an upper limit, 170 or less, 70 or less, 30 or less, or 8 or less.

The indices, m' and p' independently are an integer equal to or greater than 1. Specifically, m' may be, at a lower limit, 1 or more, 2 or more, 3 or more, or 4 or more, and at an upper limit, 50 or less, 30 or less, 20 or less, or 16 or less. p' may be similarly defined.

The indices, n' and q' independently are an integer equal to or greater than zero (0). Specifically, n' may be, at a lower limit, 0 (zero) or more, and at an upper limit, 50 or less, 25 or less, 10 or less, or 4 or less. The index, n' may be 0 (zero). The indices, m'+n' may be, at a lower limit, 1 or more, 2 or more, 3 or more, or 4 or more, and at an upper limit, 100 or less, 55 or less, 30 or less, or 16 or less. q' and p'+q' may be similarly defined.

Weight average molecular weight (Mw) of the organosilicone surfactant is 100 to 10,000, or 400 to 2,000.

The organosilicone surfactant represented by formula [1] may be synthesized according with those disclosed in W. Noll, Chemistry and Technology of Silicones, Academic Press, New York: 1968, which is incorporated herein by reference.

Therefore, the organosilicone surfactant including the above formula [1] may further be an organosilicone surfactant including formula [1'] below, an organosilicone surfactant including formula [1"] below or an organosilicone surfactant including formula [1'''] below:

wherein, $R^2$, x, y, m' and n' are the same as described above,

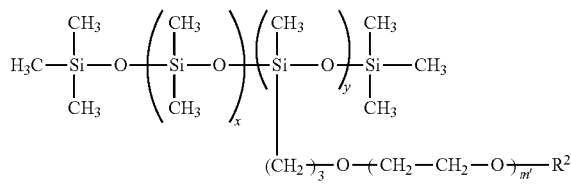
[1"]

wherein, $R^2$, x, y and m' are the same as described above,

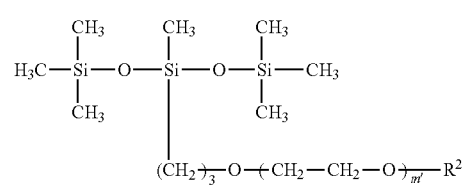
[1''']

wherein, $R^2$ and m' are the same as described above.

Therefore, the organosilicone surfactant including the above formula [1-2] may further be an organosilicone surfactant including formula [1-2'] below, an organosilicone surfactant including formula [1-2"] below or an organosilicone surfactant including formula [1-2'''] below:

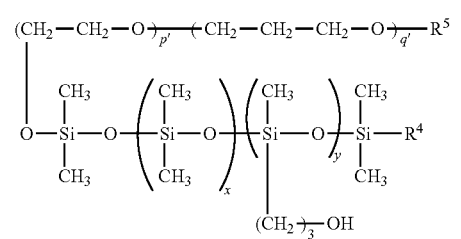
[1-2']

wherein, $R^4$, $R^5$, x, y, p' and q' are the same as described above.

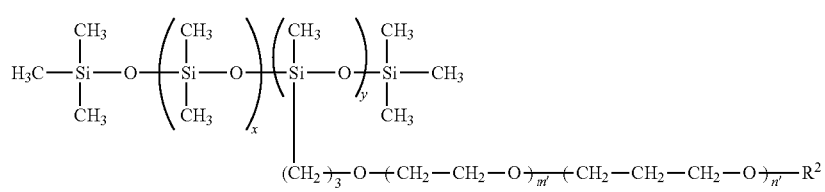
[1']

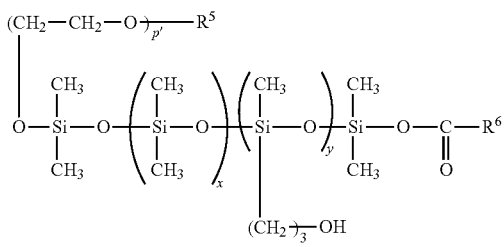

wherein, $R^5$, $R^6$ and $p'$ are the same as described above.

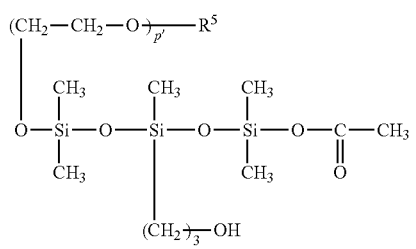

wherein, $R^5$ and $p'$ are the same as described above.

The amount of the organosilicone surfactant is, at a lower limit, 0.001% (v/v) or more, 0.01% (v/v) or more, or 0.03% (v/v) or more in an aqueous solution, and at an upper limit, 1.5% (v/v) or less, or 1.0% (v/v) or less, or 0.5% (v/v) or less, or 0.2% (v/v) or less, or 0.1% (v/v) or less in an aqueous solution.

As an example, one of organosilicone surfactant suitable for usage in preventing or minimizing air bubbles is trisiloxane surfactant ("trisiloxane"). Trisiloxane may have the following structure:

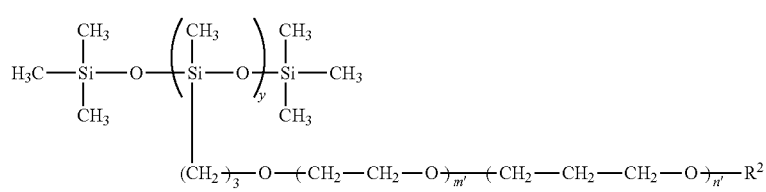

wherein, $R^2$, $y$, $m'$ and $n'$ are the same as described above and $m'+n'=4$ to $12$,

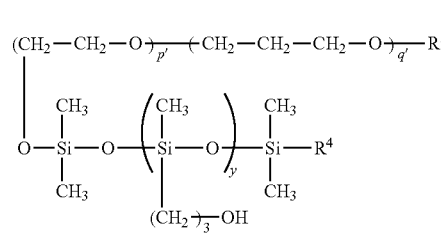

wherein, $R^4$, $R^5$, $y$, $p'$ and $q'$ are the same as described above and $p'+q'=4$ to $12$, In terms of ranges, 1.5% to 0.001% (v/v) of organosilicone surfactant such as trisiloxane may be incorporated into buffers and reagents to prevent or minimize air bubble formation. The range of organosilicone surfactant additive such as trisiloxane may be 0.2% to 0.01%, and may be further limited from 0.1% to 0.01%. Trisiloxane may be by itself or may be in a form of Superwetting Agent® (SWA), which, for example, includes greater than 60.0% methyl (propylhydroxide, ethoxylated) bis(trimethylsiloxy) silane, 15-20% polyethylene oxide monoallyl ether, and equal to or less than 9% polyethylene glycol, or it may be in purified form such as Dow-309 (3-(3-Hydroxypropyl)-heptamethyltrisiloxane, ethoxylated, acetate) from Dow-Corning Corp. Organosilicone surfactant produced by GE called Silwet such as Silwet 408, Silwet L-77 and organosilicone surfactant produced by Shin-Etsu Chemical Co., Ltd. such as KF-640, KF-642, and KF-643, may also be used.

Figure 1B:
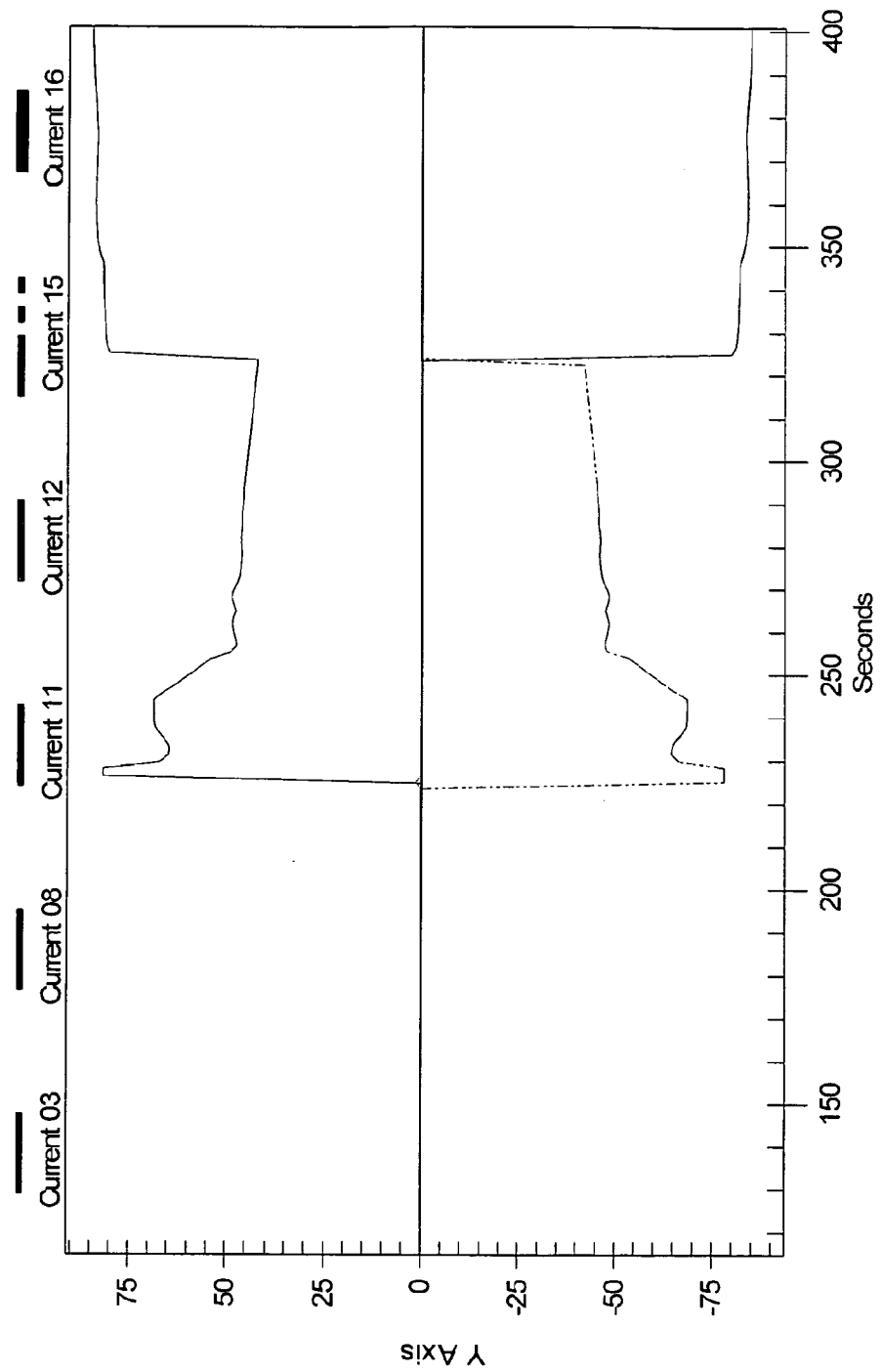

FIGS. 1A and 1B respectively illustrate what can happen in an assay system when (A) no organosilicone surfactant such as trisiloxane are used so that air bubbles form in the channels and when (B) surfactants are used to prevent or minimize forming air bubbles. FIG. 1A is an example of current failure caused by incomplete channel wetting. Aqueous buffers were provided directly into dry hydrophobic microchannels of a microfluidic device without the use of organosilicone surfactants or alcohol pre-wetting so the air bubbles resulted in the channels. When current was applied through the channels for running an assay procedure, the resulting current fluctuated wildly because of current discontinuity induced by the air bubbles, leading to current failure. FIG. 1B shows an example in which reagents that contained 0.1% (v/v) trisiloxane were directly filled into the microchannels of a microfluidic device so that air bubbles were largely prevented, if not all, from forming. There was no wildly fluctuating current but a relatively steady current conduction, as expected with channels without air bubbles. Thus, for conducting assay procedures, for example, capillary electrophoresis (CE) or isotachophoresis (ITP), that require running current through the channels, use of organosilicone surfactants such as trisiloxane in reagents contribute to avoiding assay failure because of air bubbles.

The buffer may be used for electrophoresis but is not limited to this technique. Other techniques that the buffer may be used include, for example, hybridization, assay and immunization assay. The buffer may be, for example, Tris buffer, a phosphate buffer, Veronal buffer, a borate buffer, Good's buffer, SSC buffer, TBE buffer, TAE buffer, a histidine buffer, an imidazole buffer. The concentration of the buffer may be, for example, 0.1 mM to 10 M, 1 mM to 5 M, or 5 mM to 1M. In addition, pH of the buffer may be, for example, 2 to 13, 4 to 11, 5 to 9, 6 to 8, 6 to 9, or 6 to 10.

The aqueous solution is applied to a channel, particularly microchannel.

The aqueous solution contains at least the buffer and the organosilicone surfactant, and may also contain the blocking agent. Moreover, the aqueous solution may further contain at least one component selected from the group consisting of a leading ion, a trailing ion, an analyte, a sample, an analogue, a labeling substance, an antibody, an antigen, a nucleic acid chain, a protein, a charged polymer, a charged substance forming a micelle, separation media (polymers-sieving matrix).

As a leading ion, any ion having an electrophoretic speed faster than that of an analyte or an analogue may be used. Such an ion includes, for example, Cr. The ion concentration may range from, for example, 1 µM to 10 M, 100 µM to 1 M, or 1 mM to 500 mM.

As a trailing ion, any ion having an electrophoretic speed slower than that of an analyte or an analogue may be used. Such an ion includes, for example, Good's buffer such as HEPES, TAPS, MES, MOPS, an amino acid such as glycine, threonine. The concentration may be, for example, 1 µM to 10 M, 100 µM to 1 M, on mM to 500 mM.

The analyte includes, for example, a nucleotide chain (for example, a sequence specific oligonucleotide chain and a polynucleotide chain); a chromosome; a peptide chain (for example, C-peptide and angiotensin I), serum proteins [for example, procalcitonin, immunoglobulin A (IgA), immunoglobulin E (IgE), albumin, ferritin]; enzyme [for example, an amylase (pancreatic type, salivary gland type and X-type), an alkaline phosphatase (for example, hepatic, osseous, placental and small intestinal), an acid phosphatase (for example, PAP), a γ-glutamyl transferase (for example, renal, pancreatic and hepatic); microorganism such as bacteria (for example, tuberculosis bacteria, pneumococcal organisms, diphtheria organisms, meningococcus, gonococcus), viruses (for example, rubella virus, herpes virus, hepatitis virus, ATL virus, AIDS virus), fungus (for example, *candida* and *Cryptococcus*), spirochete (for example, leptospire, *Treponema pallidum*), chlamydia and mycoplasma; allergens causative of bronchospasm, allergic rhinitis and atopic dermatitis (for example, allergen derived from the house dust, mites such as *Dermatophagoides farinae* and *Dermatophagoides pteronyssinus*, pollen from cedar, cypress, *Pasupalum thunbergii*, ragweed, timothy, sweet vernal grass and rye, an animal such as a cat, a dog or a crab; protein antigen tumor marker (for example, PSA, PGI and PGII); a carbohydrate antigen [AFP (for example, L1 to L3), hCG (for example, hCG family), transferrin, IgG, thyroglobulin, carcinoembryonic antigen (for example, CEA, NCA, NCA-2 and NFA), CA19-9, PIVKA-II, CA 125, prostate-specific antigen]; carbohydrate (sugar) chain [for example, hyaluronic acid, β-glucan and carbohydrate (sugar) chain contained in the above-described carbohydrate antigen; a carbohydrate (sugar) chain binding protein (for example, hyaluronic acid binding protein and β-glucan binding protein); lectin (for example, concanavalin A, lentil lectin); phospholipid (for example, cardiolipin); lipopolysaccharide (for example, endotoxin); chemical substances (hormones such as PTH, T3, T4, TSH, insulin, LH, FSH and prolactin; a receptor (for example, receptor for estrogen and TSH); a ligand (for example, estrogen and TSH); and antibodies thereto.

The antibody encompasses a decomposition product such as Fab and $F(ab')_2$ fragments produced by degradation with a proteolytic enzyme (for example, proteinase) such as papain or pepsin or by chemical degradation.

In addition, the analyte may be labeled by a labeling substance directly or through a substance binding to the analyte.

The sample is exemplified by the following: samples of biological origin including body fluid such as serum, plasma, spinal fluid, synovial fluid, lymph fluid, excretions such as urine, faces, expectoration, purulent matter, dermal exfoliation, environmental samples such as food, beverage, tap water, seawater, water of lakes and marshes, river water, factory waste water, washings for semiconductors, washings after washing of medical instruments; and their processed products reconstituted by dissolving in water or a buffer such as Tris buffer, phosphate buffer, Veronal buffer, borate buffer, and Good's buffer. A sample encompasses an analyte as described above produced by chemical synthesis.

The analogue includes, for example, an analyte in a sample, a target of an analysis; one in which a part of structure of an analyte in a sample is, for example, modified, altered, denatured, or removed (the so-called analogue). Other examples of analogues are a recombinant protein with partial mutations; a peptide with partially modified peptide sequence; a nucleotide chain containing partially modified nucleotide sequences. Specific examples of an analyte in a sample, a target of an analysis, are as described above.

In addition, the analogue may be labeled by a labeling substance directly or through a substance binding to the analogue.

A labeling substance, may be used in an enzyme immunoassay (EIA), a radio immunoassay (RIA), a fluorescent immunoassay (FIA), and a hybridization method, for example. A labeling substance includes, for example, enzymes such as alkaline phosphatase (ALP), β-galactosidase (β-Gal), peroxidase (POD), microperoxidase, glucose oxidase (GOD), glucose-6-phophate dehydrogenase (G6PDH), malate dehydrogenase and luciferase. All of these enzymes can be used to provide enzyme amplified signals to increase assay sensitivity. A labeling substance can be a dye, particularly, high quantum yield fluorescent dyes such as Alexa Fluor dyes (Molecular Probes Inc.) or Hilyte dyes (AnaSpec inc.) or CyDyes (Amersham Bioscience Inc) with the various excitation and emission spectra corresponding to the different analogues of the dyes. Furthermore, other fluorescent materials, such as fluorescein, rhodamine, dansyl, fluorescamine, coumarin, and rare earth fluorescent dyes such as samarium (Sm), europium (Eu), terbium (Tb) or dysprosium (Dy) and a chelate compound such as 4,4'-bis(1",1",1", 2",2",3",3"-heptafluoro-4",6"-hexanedione-6"-yl)chlorosulfo-O-terphenyl (BHHCT), 4,7-bis(chlorosulfonyl)-1,10-phenanthoroline-2,9-dicarboxylic acid (BCPDA), β-naphthyltrifluoroacetic acid (β-NTA) can be used as labeling substance. Intercalating fluorescent dyes, such as ethidium bromide, ethidium homodimer-1 (EthD-1), cyanine dimmer type dyes such as POPO-1, BOBO-1, YOYO-1, TOTO-1, and other fluorescent nucleic acid staining dyes, can be used as labels for nucleic acid probes to detect specific nucleic acid sequences. Luminescent, and spin labels can also be used as a labeling substance.

In addition, the labeling substance may be bound to the substance binding to the analyte or analogue.

The substance binding to the analyte or the substance binding to the analogue means a substance having a property capable of forming a complex between the analyte or the analogue, namely, a complex containing the analyte or the analogue as constituent by binding with the analyte or the analogue as the above described.

Such substance means the substance which binds with the analyte or the analogue by interaction such as an "antigen"-"antibody" reaction, a "carbohydrate (sugar) chain"-"protein" reaction, "carbohydrate (sugar) chain"-"lectin" reaction, "enzyme"-"inhibitor" reaction, "protein"-"peptide chain" reaction or "chromosome or nucleotide chain"-"nucleotide chain" reaction. When one of the substances in the above-mentioned pairs is the analyte or the analogue, the other is the substance binding to the analyte or analogue. For example, when the analyte or the analogue is an "antigen", the substance binding to the analyte or analogue is an "antibody", and when the analyte or the analogue is an "antibody", the substance binding to the analyte or analogue is an "antigen" (the same applied to the above other pairs).

Specifically, the substance binding to the analyte or analogue may be an antibody to the analyte or the analogue, or an antigen bound with the analyte or the analogue, or a protein binding to the analyte or the analogue.

The antibody encompasses a decomposition product such as Fab and F(ab')$_2$ fragments produced by degradation with a proteolytic enzyme (for example, proteinase) such as papain or pepsin or by chemical degradation. A substance capable of changing electrophoretic mobility of the analyte or analogue may be used, and includes an inorganic metal oxide such as silica and alumina; a metal such as gold, titanium, iron and nickel; an inorganic metal oxide introduced with a functional group by an operation such as silane coupling treatment; organisms such as various microorganisms and eukaryote cells; polysaccharide such as agarose, cellulose and insoluble dextran; synthetic polymer compounds such as polystyrene latex, a styrene-butadiene copolymer, a styrene-methacrylic acid copolymer, an acrolein-ethyleneglycol dimethacrylate copolymer, styrene-styrenesulfonic acid latex, polyacrylamide, polyglycidyl methacrylate, polyacrolein coated particles, crosslinked polyacrylonitrile, acrylic acid or acrylate ester-based polymers, an acrylonitrile-butadiene copolymer, a vinyl chloride-acrylate ester copolymer and a poly vinyl acetate-acrylate copolymer; biomolecules such as erythrocyte, sugar, nucleic acid chain (polynucleotide such as RNA, DNA), protein, polypeptide and polyamino acid (polyglutamic acid, polyaspartic acid, polylysine), lipids. The substance capable of changing electrophoretic mobility of the analyte or analogue may be nucleic acid (a nucleotide chain), protein, polypeptide or polyamino acid, or may be nucleic acid (a nucleotide chain) or polyamino acid. The nucleic acid chain may be single strand, double strand, or more, or may be double strand.

The substance capable of changing electrophoretic mobility of the analyte or analogue may be bound to the analyte or analogue directly or through the substance binding to the analyte or analogue.

In addition, the substance capable of changing electrophoretic mobility of the analyte or analogue may be labeled by a labeling substance and/or bound to the substance binding to the analyte or analogue.

As a charged polymer to block non-specific interferences, one having the opposite charge (plus or minus) from that of a co-present substance in a sample.

Examples of a charged polymer include polyanionic polymers and polycationic polymers.

Polyanionic polymers include, polysaccharides such as heparin, heparan sulfate, chondroitin sulfate, dextran sulfate, polytungstic acid, tungstophosphoric acid, hyaluronic acid, dermatan sulfate and polyanethole sulfate; polynucleotides such as DNA (for example, plasmid DNA, calf thymus DNA, salmon sperm DNA, DNA bound with cellulose and synthetic DNA), and RNA; polypeptides such as polyamino acids (for example, polyaspartic acid, polyglutamic acid), a synthetic polypeptide; synthetic polymer compounds such as poly-dIdC, polyvinyl sulfate, and polyacrylic acid; ceramics such as glass particle, colloidal glass, and glass milk; and complexes thereof.

In addition, polycationic polymers include, polysaccharides such as chitosan, and derivatives thereof; polypeptides such as polylysine, polyhistidine, polyarginine, protamine, histone, and ornithine; synthetic polymer compounds such as polyallyl amine, polyethylene imine, and polyvinyl amine; polyamines such as spermine and spermidine; cationic lipid; ceramics; and complexes thereof.

Polyanionic polymers may be an anionic polysaccharide or may be heparin.

The above-described charged polymers may be used independently or in a suitable combination with two or more types.

Any charged micelle substance may be used as long as its electrophoretic speed is faster than that of an analyte or an analogue. Such a charged substance includes, for example, a surfactant such as SDS. The amount over the critical micelle concentration may be used. The concentration of the charged substance may be, for example, 1 µM to 10 M, 100 µM to 1 M, or 1 mM to 500 mM.

Examples of fillers are but not limited to polyethers such as polyethylene oxide (polyethylene glycol), polypropylene oxide; polyalkylene imines such as polyethylene imine; polyacrylic acid polymers such as polyacrylic acid, polyacrylate esters, and poly(methyl acrylate); polyamide-based polymers such as polyacrylamide, polymethacrylamide; polymethacrylic acid-based polymers such as polymethacrylic acid, polymethacrylate esters and poly(methyl methacrylate); polyvinyl-based polymers such as polyvinyl acetate, polyvinyl pyrrolidone and polyvinyl oxazolidone; water-soluble hydroxyl polymers such as pullulan, elsinan, xanthan, dextran and guar gum; water-soluble cellulosic compounds such as methyl cellulose, hydroxyethyl cellulose and hydroxypropyl cellulose; derivatives thereof, and copolymers having a plurality of kinds of monomer unites composing these polymers. These fillers may be used independently or in combination with two or more types.

Molecular weight of the fillers as described above may be 500 Da to 6000 kDa, 1 to 1000 kDa, or 50 to 500 kDa.

Concentrations of the fillers as described above may suitably be selected from a range 0.01 to 40% (w/v), 0.01 to 20% (w/v), or 0.1 to 10% (w/v).

When performing assays such as immunoassays, organosilicone surfactants such as trisiloxane may be combined with blocking agent, which is used for preventing a interaction between the surface of the channel and a component in the aqueous solution. The blocking agent may be contained in the aqueous solution having the buffer and the organosilicone surfactant or in other aqueous solution having no organosilicone surfactant. The aqueous solution containing the buffer, the organosilicone surfactant and the blocking agent may be applied to the channel, or the aqueous solution containing the buffer and the organosilicone surfactant and the aqueous solution containing the blocking agent and no organosilicone surfactant may be applied to the channel separately.

The blocking agent may be polyoxyethylene-polyoxypropylene copolymers and/or poly-dimethyleacrylamide (p-DMA).

The blocking agent—the poly(alkylene oxide) oligomer—may have the structure as follows:

[2]

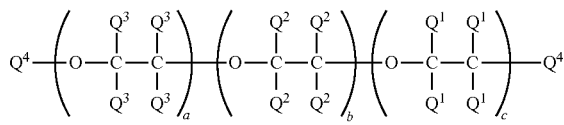

where each $Q^1$ is a hydrogen atom or an alkyl group having 1 to 4 carbon atoms, each $Q^2$ is a hydrogen atom or an alkyl group having 1 to 4 carbon atoms, each $Q^3$ is a hydrogen atom or an alkyl group having 1 to 4 carbon atoms, and each $Q^4$ is a hydrogen atom or an —OH group, wherein a, b, and c are independently an integer equal to or greater than 1.

An alkyl group having 1 to 4 carbon atoms represented by $Q^1$, $R^2$ and $Q^3$ in formula [2] may be straight chain or branched, or may be a straight chain and includes a group having preferably 1 to 2 carbon atoms, and specifically includes, for example, a methyl group, an ethyl group, an n-propyl group, an isopropyl group, an n-butyl group, an isobutyl group, a sec-butyl group, a tert-butyl group. $Q^1$ in formula [2] may be a hydrogen atom.

Three of $Q^2$ in formula [2] may be each a hydrogen atom and the remaining one may be an alkyl group having 1 to 4 carbon atoms, or three of $Q^2$ may be each a hydrogen atom and the remaining one may be a methyl group.

$Q^3$ in formula [2] may be a hydrogen atom.

In formula [2], a is an integer equal to or greater than 1. Specifically, a may be, at a lower limit, 1 or more, or 12 or more, and at an upper limit, 130 or less, 101 or less, or 50 or less.

In formula [2], b is an integer equal to or greater than 1. Specifically, b may be, at a lower limit, 1 or more, 2 or more, 50 or more, and at an upper limit, 100 or less, or 70 or less.

In formula [2], c is an integer equal to or greater than 1. Specifically, c may be, at a lower limit, 1 or more, or 12 or more, and at an upper limit, 130 or less, 101 or less, or 50 or less.

The indices, a+b+c may be, at a lower limit, 3 or more, 20 or more, or 40 or more, and at an upper limit, 500 or less, 350 or less, 300 or less, or 250 or less.

Weight average molecular weight (Mw) of the poly(alkylene oxide) oligomer represented by formula [2] is 4700 to 13,000 or 8400 to 12,600.

The poly(alkylene oxide) oligomer including the above general formula [2] may be a poly(alkylene oxide) oligomer including the following general formula [2'], a poly(alkylene oxide) oligomer including the following general formula [2"] or a poly(alkylene oxide) oligomer including the following general formula [2'''] :

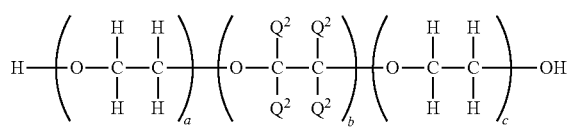

[2']

wherein, $Q^2$, a, b and c are the same as described above,

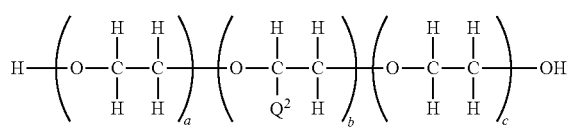

[2"]

wherein, $Q^2$ is the same alkyl group having 1 to 4 carbon atoms as described above, and a, b and c are the same as described above,

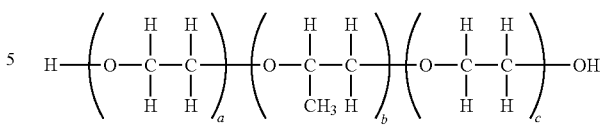

[2''']

wherein, a, b and c are the same as described above,

The amount of the blocking agents is as at a lower limit, 0.001% (v/v) or more, 0.01% (v/v) or more, or 0.03% (v/v) or more in an aqueous solution, and at an upper limit, 5% (v/v) or less, 0.5% (v/v) or less, or 0.1% (v/v) or less in an aqueous solution.

Figure 2A:
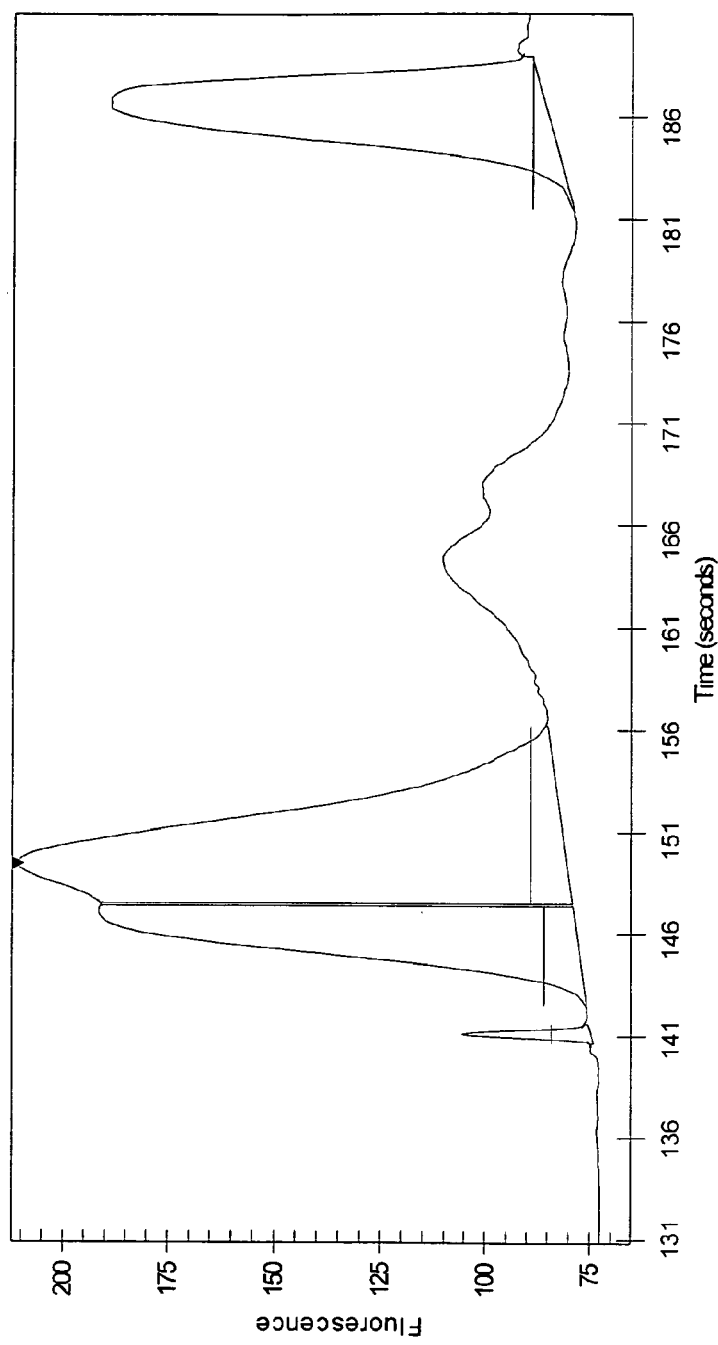
FIGS. 2A and 2B show electrophoregrams according to an embodiment of the present invention.
Figure 2B:
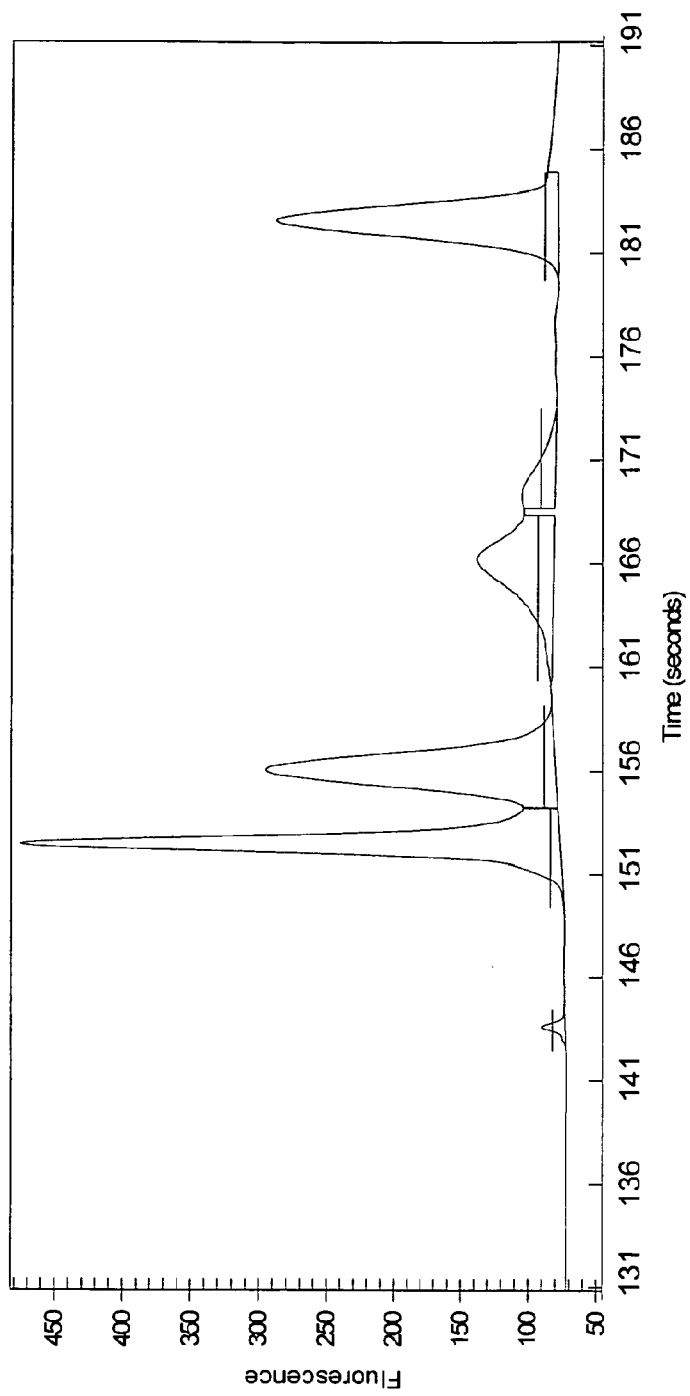

One example of a blocking agent that can be used to enhance assay performance is Pluronic® F-127. For example, combining trisiloxane with a poly(alkylene oxide) oligomer such as Pluronic® F-127 can produce an optimal separation of samples such as α-fetoprotein (AFP) isoforms L1 and L3. L3 is a fucosylated isoform of AFP. FIG. 2A shows electrophoregram of an AFP isoform immunoassay using a COP microchip, a microfluidic device with channels and interconnecting wells, with an organosilicone surfactant wetting agent added in the buffer and reagents (final concentration of 0.1% trisiloxane) but with no poly(alkylene oxide) oligomer such as Pluronic® F-127. Directly filling the reagents into the microchannels produced no bubbles and the reaction was successfully carried out. However, without the blocking agent, the AFP isoforms did not separate as seen by the merger of the two peaks in FIG. 2A. When a poly(alkylene oxide) oligomer, such as Pluronic® F-127 and organosilicone surfactant were added to a final concentration of 0.1% each to the reagent, L1 and L3 peaks were resolved, as seen in FIG. 2B. A poly(alkylene oxide) oligomer such as Pluronic F-127® may be incorporated into reagents and buffers in the range of 0.5% to 0.01% (v/v), and more particularly 0.1% to 0.01%.

In another example, poly-dimethylacrylamide (p-DMA) may be used as a blocking agent for immunoassays. Application of a low molecular weight p-DMA may require another blocking agent such as Pluonic F-127 to give a good peak resolution for immunoassays such as AFP isoform immunoassay but a high molecular weight p-DMA may not.

P-DMA A is an example of a low molecular weight p-DMA with Mn=56,114, Mw=114,474, Mw of peak=88,461, and Mw/Mn=2.04, where Mn is the number average molecular weight of p-DMA and Mw is the weight average molecular weight of p-DMA. The concepts of "number average molecular weight" and "weight average molecular weight" are well defined parameters in the art of polymer chemistry and can be empirically determined. Typically, the number average molecular weight is measured by gel permeation chromatography, viscometry (Mark-Houwink equation), and colligative methods like vapor pressure osmometry or end-group titration; and the weight average molecular weight of polymers is measured by light scattering, small angle neutron scattering (SANS), X-ray scattering, and sedimentation velocity. Peak refers to the molecular sizing chromatography peak used to measure the molecular size of the polymers.

The low molecular weight (LMW) p-DMA A by itself did not appear to block polymeric chips for AFP isoform immunoassays at 0.9% (v/v). However, by combining p-DMA A with Pluronic F-127 at 0.1% produced good peak resolutions. On the other hand, a high molecular weight (HMW) p-DMA B with Mn=411,696, Mw=1,009,890, Mw of peak=1,042, 960, and Mw/Mn=2.453 did give good peak resolutions for AFP isoform immunoassays at 0.9% without Pluronic F-127. Furthermore, p-DMA C with Mn=356,223, Mw=1,114,600, Mw of peak=1,080,200, and Mw/Mn=3.126 also gave similar results as the HMW p-DMA B. It is thought that the HMW p-DMA being a longer polymer will have higher binding affinity for the plastic surface to block the surface more effectively than the LMW p-DMA.

The examples of the blocking agents have been described in terms of the AFP isoform immunoassays but the usage of the blocking agents is not limited to any one particular assay.

Not only particular assay systems but any analytical or clinical diagnostic methods that require filling or transferring aqueous liquids through hydrophobic channels can benefit from the use of organosilicone surfactant additives such as trisiloxane in enhancing wetting/filling properties of hydrophobic surfaces of polymeric materials.

In addition to incorporating organosilicone surfactant directly to the reagent as a component, concentrated surfactant (>1%) can be applied to treat hydrophobic surfaces prior to filling the channels with aqueous reagents. The treated surface is rinsed with water to remove non-adsorbed surfactants. Reagents without organosilicone surfactant can then be filled subsequently. This technique may be useful for micellar electrokinetic chromatography (MECC), where amphipathic surfactants are often chosen to bind and separate the target analytes. Adsorbing organosilicone surfactant such as trisiloxane onto hydrophobic surfaces and washing any excess can avoid introducing organosilicone surfactant in the bulk fluid to cause undesirable interferences in MECC because surfactants at high concentrations (higher than critical micelle concentration (CMC)) form micelles. (Terabe, S et al. Electrokinetic separations with micellar solutions and open-tubular capillaries. Anal Chem, 1984; 56:111)

In another application, organosilicone surfactant can be added to aqueous buffers containing cells that are to be sorted or counted either within or along microchannels (*Bacterial cell sorting in microchannels*, Lastoskie, C. M.; Sastry, A. M.; Forrester, S. B.; Kim, T. Y. Bio-, Micro-, and Nanosystems, 2003. ASM Conferences, 7-10 Jul. 2003) to prevent/minimize the sticking of cells or air bubbles to the wall of the analytical apparatus. Depending on the detection system, air bubbles are likely to increase the incidence of false positive data.

For low pressure liquid chromatography (LC) conducted in microchannels (Regnier F E et al. Chromatography and electrophoresis on chip: critical elements of future integrated, microfluidics analytical systems for life science, Trends Biotechnol, 1999; 17:101) with hydrophobic walls, organosilicone surfactant can be added to the mobile phase of LC. Aqueous buffers containing organosilicone surfactant such as trisiloxane can be pumped directly into the microcolumns without leaving air bubbles behind. Trapped air bubbles often cause resolution loss and/or column failure in p-LC.

Capillary zone electrophoresis (CZE) (Jorgenson J W and Lukacs K D, Capillary zone electrophoresis, Science, 1983, 222: 266) has been applied to separate and detect charged as well as nonionic species, ranging in size from small ions, macromolecules (proteins, lipids, carbohydrates and nucleic acids such as DNA or RNA), to whole cells. This analytical technique is useful in a large varieties of fields, spanning from environmental monitoring to quality control of pharmaceutical products (bio- or chemical) and biomedical research. The electrolytes used in CZE separation are typically aqueous in nature. Consequently, when plastic or hydrophobic channels are used, it is exceedingly difficult to fill the microchannels without generating air bubbles. By including organosilicone surfactant such as trisiloxane in buffers, air bubbles can be prevented or minimized from forming, which leads to a realization of using CZE on polymeric microchips. Furthermore, robustness and reproducibility of the CZE assay can also be improved by the inclusion of a blocking agent that prevents the adsorption of the molecules to be separated that were described above and also detection reagents such as labeled binding partners like antibodies or labeling dye molecules like DNA or RNA intercalating fluorescent dyes or protein staining fluorescent dyes.

As part of a synthetic, purification or manufacturing process, the presence and/or levels of positional, chiral or stereo-isomers often need to be determined (structural isoform analysis). This can be accomplished by micellar electrokinetic chromatography in either conventional capillaries or microchannels on microchips. When the separation channel has a hydrophobic surface, it is desirable to add organosilicone surfactant such as trisiloxane to facilitate the filling of the analyte and the electrolytes in aqueous solutions. If other surfactants are used as a pseudo-phase to effect the separation, however, a concentration of the organosilicone that falls below its own CMC can be selected to avoid interference.

Devices with micro-scale chambers and/or channels fabricated to form the basis of a micro-total analysis system (µTAS) or otherwise known as Lab-on-a-Chip can be applied to high throughput analyses of biomolecules at both genomics and proteomics scales, as well as routine chemical, clinical and enzymatic studies. Some primary benefits include low consumption of reagents and samples, ease of automation, lower costs and ability to seamlessly integrate multiple procedures into a single device. Such devices can be partially or entirely made of polymeric substrates or coatings that have little or no charge characteristics.

While having a virtually non-charged surface provides desirable traits, such as minimal adsorption of charged species (e.g. proteins and nucleic acids), the key disadvantage lies in its hydrophobicity. Hydrophobic surfaces are not compatible to aqueous buffers and reagents that are commonly employed in the life sciences. Partial wetting of hydrophobic channels typically results in trapped air gaps that produce liquid and electrical current discontinuity. The complete wetting of such devices can be enabled by the addition of organosilicone surfactants including trisiloxane to the aqueous reagents. Organosilicone surfactants greatly reduce the surface tension at the interface between aqueous reagents and hydrophobic surface, and in doing so, facilitate the complete wetting of hydrophobic microchannels by aqueous solutions, which results in preventing or minimizing formation of air bubbles.

The method of applying the aqueous solution includes but not limited to a method for applying the aqueous solution to the channel electrically by application of voltage onto the channel; a method for applying the aqueous solution to the channel by pressurizing or depressurizing the channel; and a method for applying the aqueous solution to the channel by using a capillary action.

Electrophoretic methods based on various principles (separation modes) can be used. An electrophoresis method includes, for example, methods using difference in electrophoretic mobility in a capillary such as (1) Field Amplification Sample Stacking Method (FASS) [US-A-2003-0057092 A1; Weiss, D. J., Saunders, K., Lunte, C. E. *Electrophoresis* 2001, 22, 59-65; Britz-McKibbin, P., Bebault, G. M., Chen, D. D. Y. *Anal Chem.* 2000, 72, 1729-1735; and Ross, D., Locascio, L. E. *Anal Chem.* 2002, 71, 5137-5145]; (2) Field Amplification Sample Injection Method (FASI)[Chien, R. L. et al. *J. Chromatogr.* 1991, 559, 141-148, and the like]; (3)

Isotachophoresis (ITP) [Everaerts, F. M., Geurts, M. Mikkers, F. E. P., Verheggen, T. P. E. M *J Chromatogr.* 1976, 119, 129-155; Mikkers, F. E. P., Everaerts, F. M., Peek, J. A. F. *J. Chromatogr.* 1979, 168, 293-315; Mikkers, F. E. P., Everaerts, F. M., Peek, J. A. F. *J. Chromatogr.* 1979, 168, 317-332; Hirokawa, T, Okamoto, H. Ikuta, N., and Gas, B., Analytical Sciences 2001, Vol. 17 Supplement i185, and the like]; (4) Isoelectric Focusing method (IF) [Wehr T, et al., *Am. Biotechnol. Lab.* 1990, 8, 22; Kilar F. et al., and Electrophoresis 1989, 10, 23-29]; (5) Large-volume sample stacking method (LVSS) [Siri, N. et al., J. Chormatogr. B, (2003), 793, 151-157]; (6) pH junction method (pH-mediated stacking) [P. Britz-McKibbin et al., 2000, *Anal. Chem.,* 72, 1242, P. Britz-McKibbin et al., 2002, *Anal. Chem.,* 74, 3736]; (7) Sweeping method (stacking micellar electrokinetic chromatography) [J. P. Quirino et al., 1998, *Science,* 282, 465, J. P. Quirino et al., 1999, *Anal. Chem.,* 71, 1638, Y. Sera et al., 2001, *Electrophoresis,* 22, 3509]; so-called a capillary zone electrophoresis method (CZE) for separation of an objective substance by moving each substance in different speed depending on intensity of a charge thereof, wherein a capillary is fundamentally filled with only a buffer solution for electrophoresis, [Reference: H. Hisamoto at al., Chem. Commun., (2001), 2662, and the like]; so-called a micelle electro kinetic chromatography (MEKC) using a charged substance forming an ionic micelle, and separating a objective substance by interaction with said micelle, [Reference: S. Terabe, Trends Anal. Chem., (1989), 8, 129, and the like]; so-called a capillary gel electrophoresis method (CGE) for separating an objective substance by using a filler such as a polymer having molecular sieve effect, and by charge of a molecule and size of a molecule inducing interaction with a polymer, [Reference: S. Hjerten, J. Chromatogr., (1987), 397, 409]. The above and any references cited herein are incorporated by reference.

The voltage is applied so that electric field intensity is in a range of, at a lower limit, not lower than 5 V/cm, not lower than 10 V/cm, not lower than 50 V/cm, not lower than 500 V/cm, or not lower than 1000 V/cm, and as an upper limit, not higher than 10000 V/cm, not higher than 5000 V/cm, or not higher than 2000 V/cm.

EXAMPLES

Example 1

An organosilicone surfactant stock solution (1% v/v) was first prepared by mixing 1 part of trisiloxane—(CAS number 67674-67-3 2-[hydroxy(polyethyleneoxy)propyl]-heptamethyltrisiloxane 8 EO) (TS-HY) with 99 parts water. To prepare reagents used to fill microchannels of a microfluidic system, a different amount of this 1% organosilicone surfactant was added to the concentrated reagents depending on the final organosilicone surfactant concentration. As an example, to prepare a 75 mM Tris-Cl pH 7.5, 0.1% organosilicone surfactant solution, 1 part 1% organosilicone surfactant, 5 parts 150 mM Tris-Cl, pH 7.5 and 4 parts water were mixed at room temperature.

Figure 3:
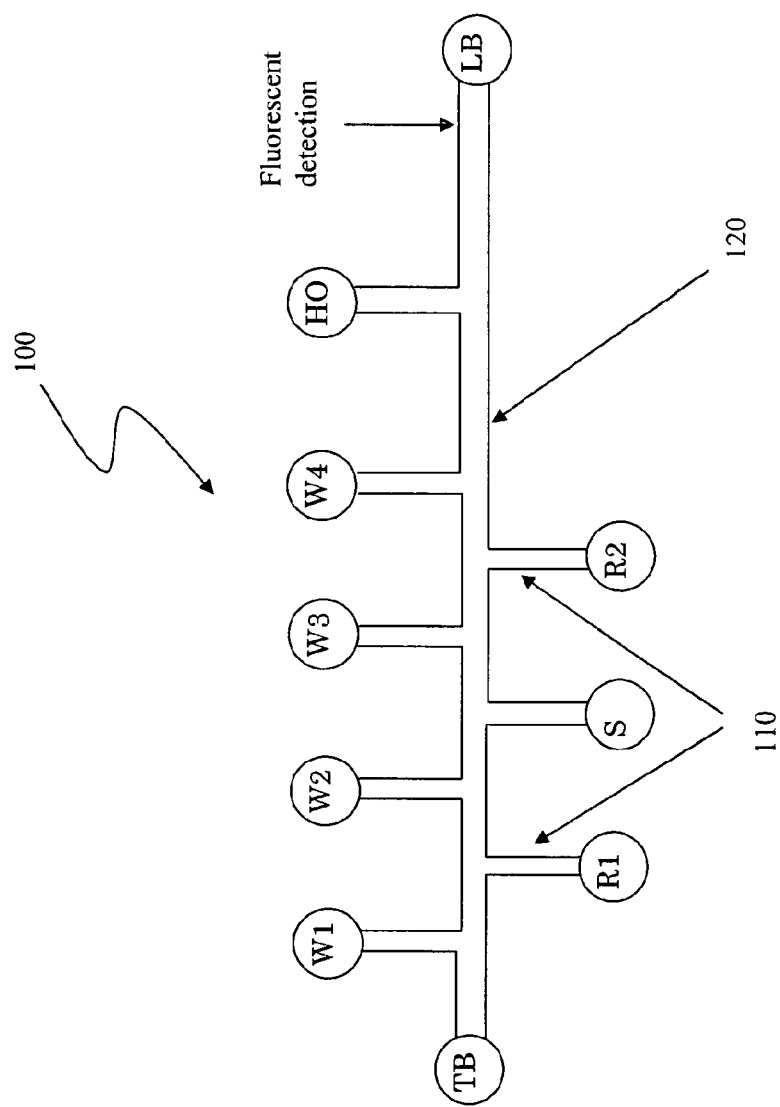
FIG. 3 shows a microchip for use in a microfluidic immunoassay according to an embodiment of the present invention.

FIG. 3, shows an exemplary microfluidic microchip 100 made of COP with interconnecting channels 110 connecting wells labeled W1 to W4 for waste wells, TB for trailing buffer well, LB for leading buffer well, R1 and R2 for reagent wells, HO for hand-off well, and S for sample well. The chip 100 was used to conduct a microchip-based AFP isoform immunoassay, as an example to show the effects of using organosilicone surfactants. AFP is a tumor marker that is ectopically expressed by hepatocellular carcinoma (HCC) cells and often elevated in HCC patient's sera. It is also produced by liver cells from patients with cirrhotic livers or infected with HCV and HBV, which decreases the specificity of AFP as a marker for HCC. The increased occurrence of an asparagine-linked carbohydrate chain on the AFP-L3 that is reactive with *Lens culinaris* agglutinin (LCA) in the case of HCC produced AFP has provided an improved diagnostic and prognostic parameter for early recognition of HCC.

In FIG. 3, the chip 100 works on an electrophoretically driven mixing method, where reagents R1 and R2 and the sample S are drawn into a central channel 120 by vacuum (apply negative pressure at the waste wells, W1-W4) in an order of mobility such that applying a voltage across TB and LB will drive them together and allow them to react. This process is called isotachophoresis (ITP) stacking. The DNA antibody provided in R1 is highly charged and moves faster than the sample, so it is concentrated by the ITP stacking before binding with the sample. The DNA antibody serves to accelerate the electrophoretic mobility of the immune-complex formed. The reacted sample (the immune-complex), provided to move faster than the antibody with a fluorescent dye in R2, further reacts to bind with this antibody. The ITP stacking then focuses the reacted sample to a narrow band, and this narrow sample band is then handed off to be separated and detected by capillary electrophoresis (CE). Therefore, after the binding reactions and ITP stacking are completed, a hand-off voltage is applied between HO and LB to separate and detect the immuno-complex by CE.

Table 1 provides the type of reagents provided at the various wells. For each of the reagents and sample, the organosilicone surfactant was provided to the final concentration of 0.1% (v/v), and these reagents and sample were provided to the appropriate wells of the microchip 100 for filing the microchannels 110 with no or a minimum amount of air bubbles.

TABLE 1

| TB zone | DNA zone | Sample zone | Hilyte zone | HO and LB zones | Waste |
| --- | --- | --- | --- | --- | --- |
| 75 mM Tris | 75 mM BisTris pH 6 | 75 mM BisTris pH 7 | 75 mM BisTris pH 7 | 75 mM Tris pH 7.5 | 75 mM Tris pH 7.5 |
| 125 mM HEPES | 50 mM NaCl | 50 mM NaCl | 50 mM NaCl | 75 mM NaCl | 75 mM NaCl |
| 0.6% pDMA A | 0.6% pDMA A | 0.6% pDMA A | 0.6% pDMA A | 0.6% pDMA A | 0.6% pDMA A |
| 0.1% PF-127 | 0.1% PF-127 | 0.1% PF-127 | 0.1% PF-127 | 0.1% PF-127 | 0.1% PF-127 |
| 3% Glycerol | 3% Glycerol | 3% Glycerol | 3% Glycerol | 3% Glycerol | 3% Glycerol |
| 0.05% Tween20 | 0.05% Tween20 | 0.05% Tween20 | 0.05% Tween20 | 0.05% Tween20 | 0.05% Tween20 |
| 0.01% BSA | 0.01% BSA | 1% BSA | 1% BSA | 0.01% BSA | 0.01% BSA |
| | 200 nM DNA-Ab | 100 nM Dye-Ab | 100 nM Dye-Ab | 2 mg/ml LCA | |
| | | 50 pM AFP-L1/L3 | 50 pM AFP-L1/L3 | | |

That is, in view of FIG. 3, the reagent labeled TB zone was provided at the well, TB, the reagent labeled DNA zone and the reagent labeled Hilyte zone were provided at R1 and R2, respectively, and the reagent with the sample labeled Sample zone was provided at S, and the reagent labeled HO and LB zones was provided at HO and LB, and the reagent labeled Waste was provided to the waste wells, W1-W4.

In Table 1, pDMA is polydimethylacrylamide (#26, 114.5 kdalton mol. wt.); PF-127 is Pluronic® F-127 (a blocking agent: $HO(C_2H_4O)_a(C_3H_6O)_b(C_2H_4O)_aH$, a=101, b=56); DNA-Ab is DNA conjugated to monoclonal antibody specific for human AFP; Hilyte-Ab is Hilyte fluorescent dye conjugated to monoclonal antibody specific for human AFP. AFP L1 and L3 are purified human α-fetoprotein isoforms L1 and L3.

The above reagents and the sample (50 pM AFP L1 and 50 pM AFP L3 in phosphate buffered saline) each containing 0.1% organosilicone surfactant and 0.1% PF-127 were injected directly from the wells into the dry microchannels. Pressure can be applied over the wells to push the liquids into the channels. Alternatively, vacuum can be applied over the waste wells to draw the organosilicone surfactant—reagents and sample into the channels. The regions occupied by the reagents and sample after they are drawn are called zones. For example, the reagents and sample were loaded by applying −5 psi at any appropriate one of the waste wells for 20 seconds. Reactants were then electrokinetically transported by isotachophoresis (ITP) with the application of 1500V from TB to LB. The resultant immuno-complex was stacked into a narrow band and separated by capillary electrophoresis (CE) with the application of 800V from HO to LB. The data acquisition rate was 20 Hz. Fluorescence detection optics were used to detect the fluorescent-labeled immune-complex as it passed the detection window near the LB well excited by a red diode laser. This separates the immuno-complex from non-specific fluorescent peaks and resolves the AFP −L1 and −L3 by electrophoresis in a sieving gel containing, for example, *L. culinaris* agglutinin (LCA) which selectively binds AFP −L3.

Figure 4A:
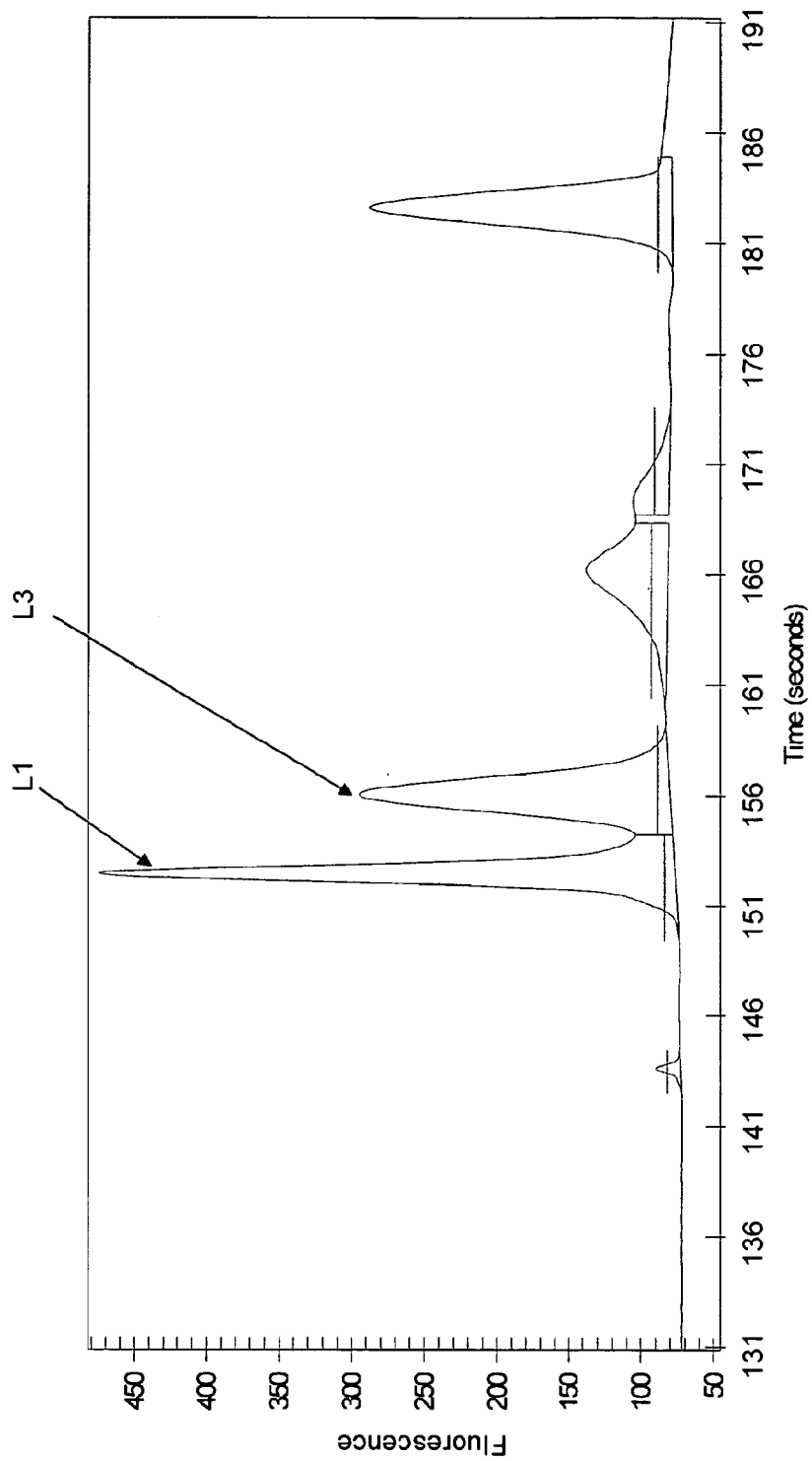
FIG. 4A shows an exemplary electrophoregram with an organosilicone surfactant (trisiloxane) in reagents according to an embodiment of the present invention.
Figure 4B:
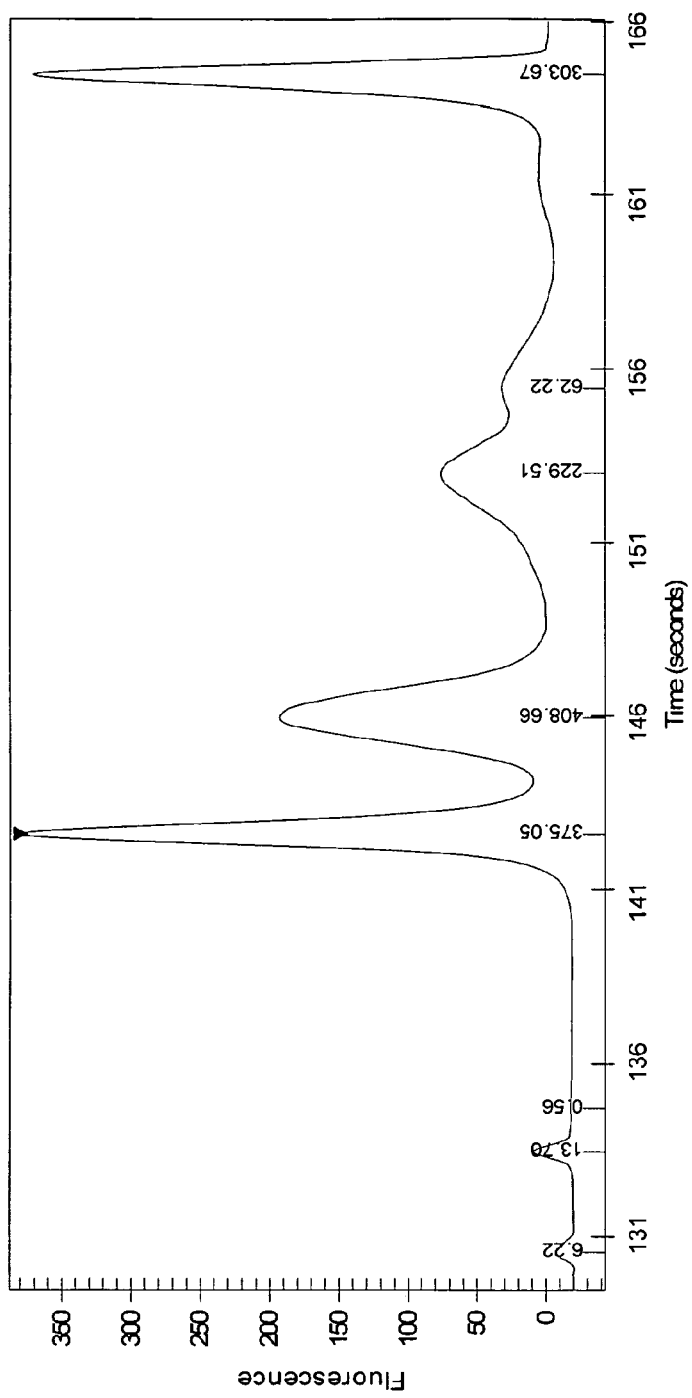
FIG. 4B shows an exemplary electrophoregram with pre-filing of alcohol in channels of a microfluidic device.

Without the surfactant, air bubbles formed along and cling to channel walls when aqueous liquids were filled directly into dry microchannels, but with the addition of the organosilicone surfactant into the reagents, air bubbles were largely prevented or minimized so that the assay was effectively carried out. FIG. 4A (which is the same as FIG. 2B) shows the result of separating and identifying AFP L1 (the first peak) and L3 (the second peak) using the chip 100. FIG. 4B shows an exemplary result of running the same AFP isoform immunoassay but without the addition of the organosilicone surfactant in the reagents and sample. Instead, the channels were pre-filed with alcohol to suppress the formation of air bubbles and then reagents were injected into the channels by pressure to displace the alcohol. A similar resolution is observed with this approach but an extra step was required using alcohols to pre-wet the hydrophobic channels. Furthermore, alcohols are difficult to store and use in practical day-to-day instrumental applications.

Example 2

In another example, in addition to enhancing the wettability of hydrophobic channels, the addition of organosilicone surfactants such as the organosilicone surfactant to the reagents also improved reproducibility of the on-chip AFP isoform immunoassay (Table 2). This example was carried out in a manner similar to Example 1 by using the same reagents as Example 1.

TABLE 2

| Channel Wetting Method | CV, AFP L1 Peak Area | CV, AFP L3 Peak Area |
|---|---|---|
| With Organosilicone Surfactant | 2.83% | 3.21% |
| With Alcohol Pre-filling | 5.79% | 5.80% |

The Coefficients of variation (CV) for the AFP isoform peak area of on-chip AFP immunoassay was 2.83% for the L1 peak area and 3.21% for the L3 peak area. The CV for AFP isoform immunoassay when no organosilicone surfactants were used but the channels were pre-filed with alcohol was 5.79% for the L1 peak area and 5.8% for the L3 peak area. The result above was averaged over six replications. The CV values indicate that the results are reliably reproducible and that reproducibility tend to be better with organosilicone surfactants than with alcohol pre-filing.

Example 3

Figure 5A:
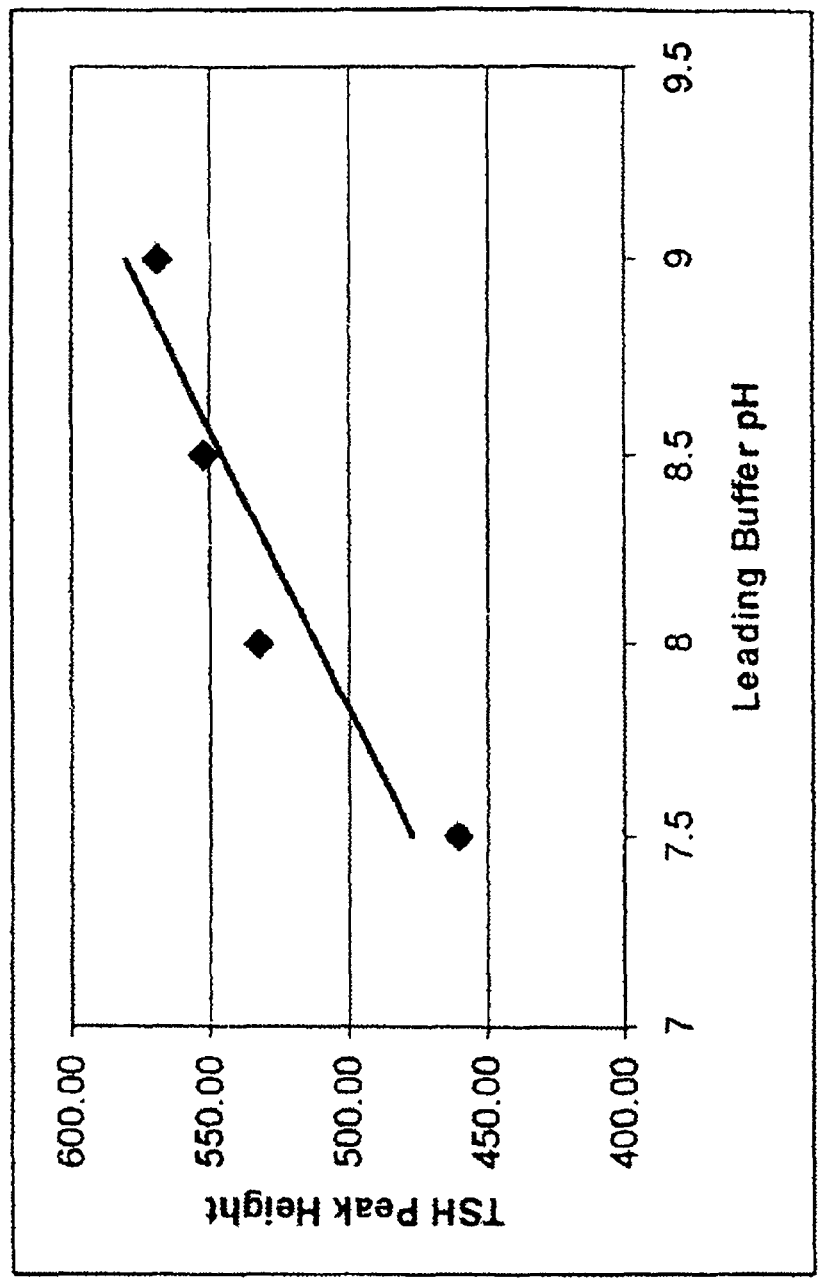
FIGS. 5A and 5B show the sharpening effect on assay peak shape as pH is increased in accordance with another embodiment of the present invention.
Figure 5B:
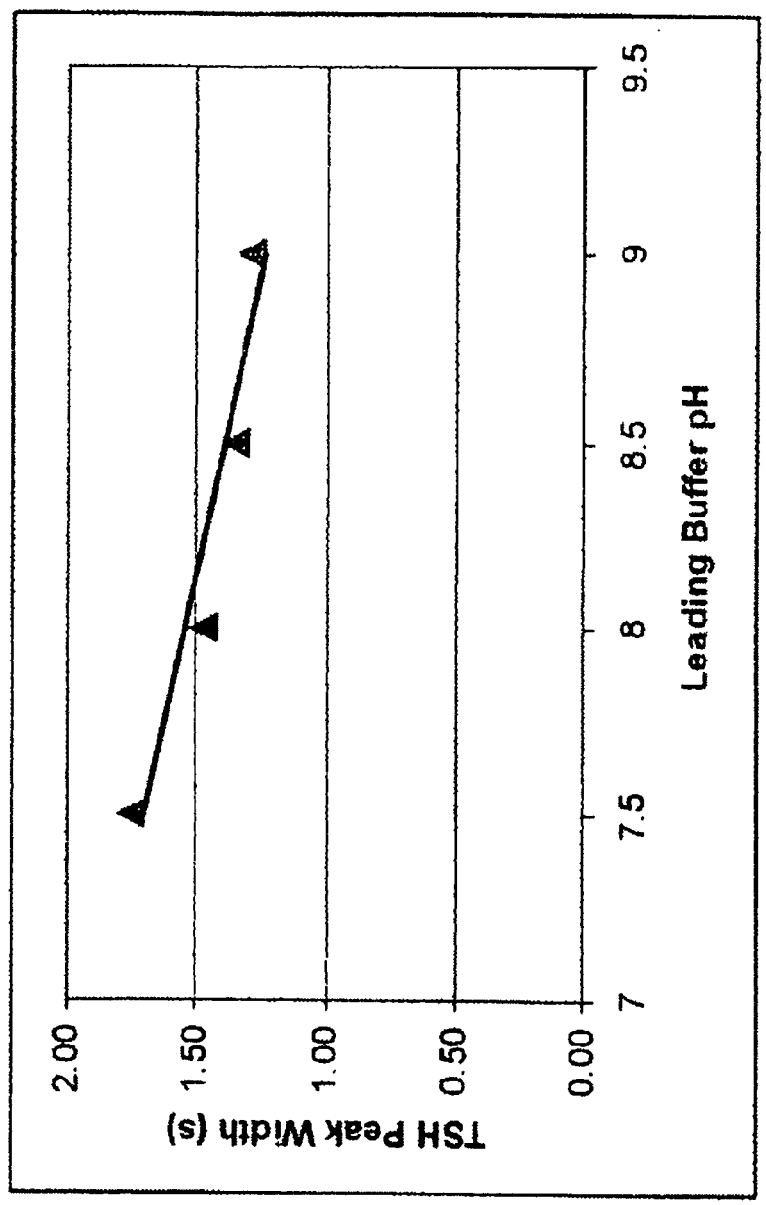

In another embodiment involving an on-chip immunoassay with thyroid stimulation hormone (TSH), pH of a leading buffer such as those described above was varied to determine the effect on the peak shape (peak height and width). This example was carried out in a manner similar to Example 1 except that monoclonal antibodies specific for TSH was used in place of the monoclonal antibodies for human AFP, and a sample containing TSH (100 mlU/L in serum) was used in place of the sample containing AFP. Reagents such as those described above and a sample (100 mlU/L. TSH in serum) containing organosilicone surfactants were added to the wells of a dry microfluidic plastic chip and filled its dry microchannels by vacuum from waste wells. Results showed that the TSH peak shape was sharpened as the pH in the leading buffer was increased from pH 7.5 to pH 9. The results are summarized in FIGS. 5A and 5B. As shown in FIG. 5A, the peak height increases as the pH is increased from 7.5 to 9.0. On the other hand, as shown in FIG. 5B, the peak width is decreased as the pH is raised from 7.5 to 9.0. These results indicate that peak shape is sharpened as the pH is increased.

Example 4

In an another embodiment, various wetting agents were tested for chip filling and assay performance effectiveness in the DCP (des-carboxy prothrombin) assay. This assay is for a protein biomarker for hepatocellular carcinoma that is post-translationally modified Prothrombin protein lacking the normal compliment of carboxy-terminated amino acid side chains. The assay for DCP utilizes similar buffer compositions as the AFP assay and antibodies specific for the DCP protein labeled with either DNA as the electrophoretic mobility modifier or with HiLyte dye as the fluorescent label. The organosilicone surfactant wetting agents tested were TS-HY (3-[hydroxy(polyethyleneoxy) propyl]heptamethyl trisiloxane) at 0.1%, KF-642 at 1%, KF-640 at 1%, and TS-ME (2-[methoxy(polyethyleneoxy)-propyl]heptamethyl trisiloxane) at 0.04%. The various organosilicone surfactants were adjusted to the stated concentrations in order to optimize their bubble-free channel filling activity and at the same time reduce their Foaming activity which is a problematic characteristic of wetting agents. The assay reagents were formulated as described in Table 3 below, with the additions of the various organosilicone surfactant wetting agents and Pluronic F-127 as specified in the table.

TABLE 3

Figure 6:
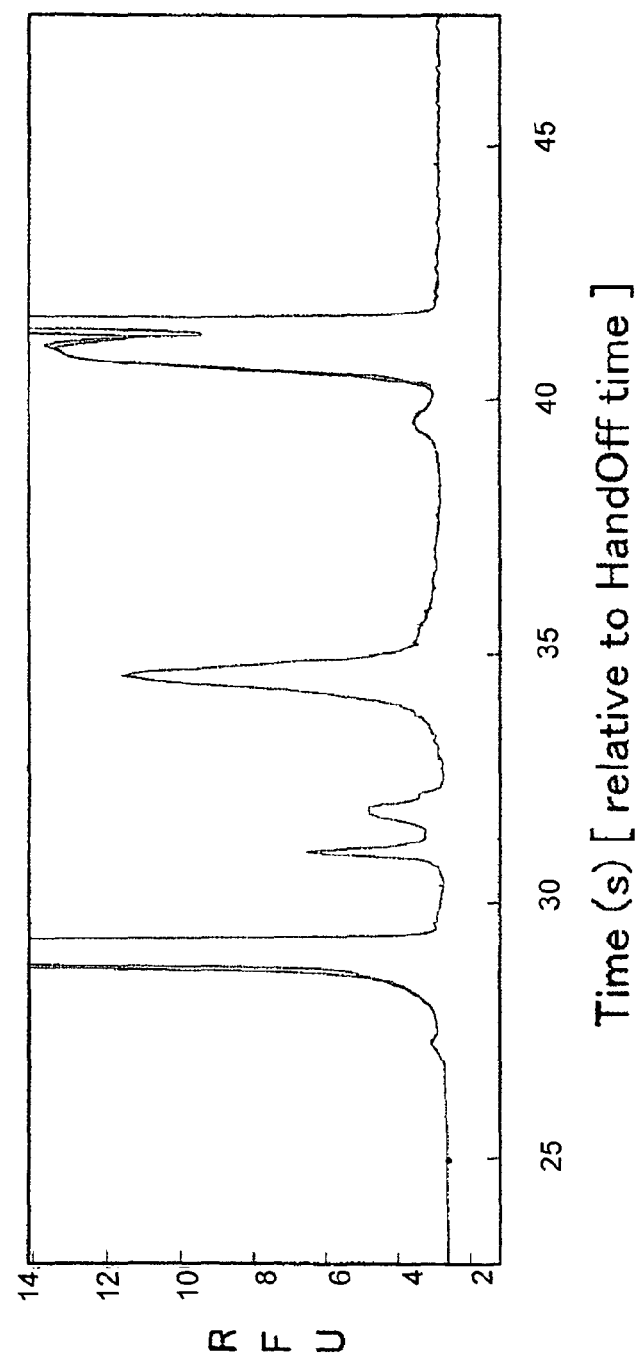
FIG. 6 shows an electropherogram according to an embodiment of the present invention.

| TB | DNA Buffer | Sample Buffer | Hilyte Buffer | Sample Calibrator | LB zone |
|---|---|---|---|---|---|
| 75 mM Tris | 75 mM BisTris pH 6 | 100 mM Tris pH 7.5 | 75 mM BisTris pH 6 | 75 mM BisTris pH 6 | 40 mM Tris pH 7.5 |
| 125 mM HEPES | 50 mM NaCl | 50 mM NaCl | 150 mM NaCl | 150 mM NaCl | 50 mM NaCl |
| 0.9% pDMA D | 1.1% pDMA D | 1.1% pDMA D | 1% BSA | 0.5% BSA | 0.6% pDMA D |
| 0.1% PF-127 | 0.1% PF-127 | 0.1% PF-127 | 0.1% Benzoic acid | DCP 4000 mAU/ml | 0.1% PF-127 |
| 3% Glycerol | 3% Glycerol | 3% Glycerol | 1 uM HiLyte-Ab | | 3% Glycerol |
| 0.05% Tween20 | 0.05% Tween20 | 0.05% Tween20 | | | 0.05% Tween20 |
| 0.01% BSA | 0.01% BSA | 0.01% BSA | | | 0.01% BSA |
| | 600 nM DNA-Ab | 1 uM Mouse IgG | | | 4% Heparin Li |
| | 0.1% Heparin Li | | | | | pDMA D has Mn of 87,024 and Mw of 231,127. Sample DCP calibrator is diluted by adding 5 ul into 11 ul of Hilyte Buffer+ 34 ul of Sample Buffer. This diluted sample was added to the Sample well (S) of the microfluidic chip shown in FIG. 3. The reagents and sample (TB, DNA Buffer, Sample-Diluted DCP calibrator, and LB) were placed in the appropriate wells of the microfluidic device as described in Example 1 for the AFP assay in microchips and FIG. 3, and the assay is run as described in Example 1. The electropherogram of a DCP assay is shown in FIG. 6. The results testing various organosilicone surfactants to the DCP reagents were as follows:

1. All the organosilicone surfactants tested aided in filling the microfluidic devices bubble-free after priming and loading the chips at the concentrations tested.
2. Migration time stability was equivalent for all the organosilicone surfactants tested.
3. Peak area recovery was equivalent for all of the organosilicone surfactants tested, except that KF-640 gave a broad peak compared with other organosilicone surfactants tested and therefore was not as useful as others tested for the DCP assay.
4. Foaming activity was rank ordered from highest to lowest, TS-HY>TS-ME=KF-642 (KF-640 ND).

In Summary the TS-HY (3-[hydroxy(polyethyleneoxy)propyl]-heptamethyl trisiloxane) at 0.1%, TS-ME (2-[methoxy(polyethyleneoxy)-propyl]heptamethyl trisiloxane) at 0.04%, and KF-642 (polysiloxane) at 1% gave good assay performance for the DCP assay. It was also found that KF-642 at 1% gave good chip filling and assay performance for the AFP assays upon further testing as well as for the DCP assay, With regard to foaming of reagents containing these added wetting agents, the KF-642 and TS-ME were lower in foaming activity. Finally, with regard to long term stability of the material in reagent formulations, KF-642 showed good stability in accelerated stability studies.

In Summary the Dow-309 (2-hydroxy terminated trisiloxane) at 0.1%, trisiloxane Silwet 408 at 0.04%, and KF-642 (polysiloxane) at 1% gave good assay performance for the DCP assay. It was also found that KF-642 at 1% gave good chip filling and assay performance for the AFP assays. With regard to foaming of reagents containing these added wetting agents, the KF-642 and Silwet-408 were lower in foaming activity. Finally, with regard to long term stability of the material in reagent formulations, KF-642 was very stable in accelerated stability studies.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An aqueous solution for applying to a channel, comprising:

a buffer; and an organosilicone surfactant, wherein the organosilicone surfactant comprises the formula of:

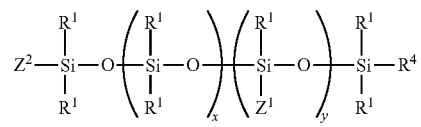

wherein $R^1$ individually is an alkyl group having 1 to 4 carbon atoms with or without an OH group, and $Z^1$ is a hydroxyalkyl group having 1 to 4 carbon atoms or a polyether group, $Z^2$ is an alkyl group having 1 to 4 carbon atoms with or without an OH group or a polyether group, $R^4$ is an alkyl group having 1 to 4 carbon atoms with or without an OH group or

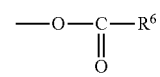

(wherein $R^6$ is an alkyl group having 1 to 4 carbon atoms with or without an OH group), x is an integer equal to or greater than zero and equal to or less than 130, and y is an integer equal to or greater than 1 and equal to or less than 40.

2. The aqueous solution according to claim 1, wherein the organosilicone surfactant comprises the formula of:

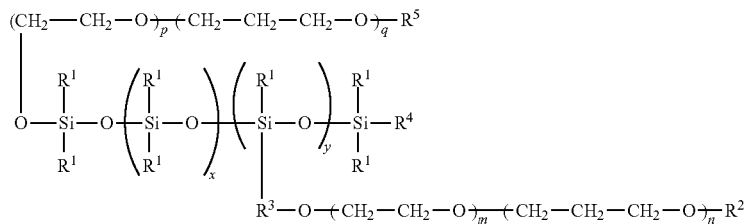

wherein $R^1$ individually is an alkyl group having 1 to 4 carbon atoms with or without an OH group, $R^2$ is an alkyl group, an acetyl group, a hydrogen atom, or an OH group, is an alkylene group, $R^5$ is a hydrogen atom or an alkyl group having 1 to 4 carbon atoms with or without an OH group, $R^4$ is an alkyl group having 1 to 4 carbon atoms with or without an OH group or

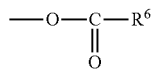

(wherein $R^6$ is an alkyl group having 1 to 4 carbon atoms with or without an OH group), x is an integer equal to or greater than zero and equal to or less than 130, y is an integer equal to or greater than 1 and equal to or less than 40, m, n, p and q are independently an integer equal to or greater than zero and equal to or less than 50, wherein at least one of m, n, p or q is at least 1.

3. The aqueous solution according to claim 1, wherein the organosilicone surfactant comprises the formulae [1] or [1-2] of:

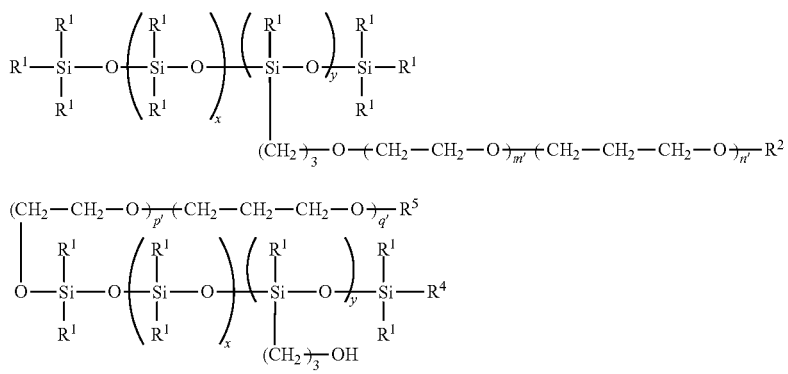

where $R^1$ individually is an alkyl group having 1 to 4 carbon atoms with or without an OH group, $R^2$ is an alkyl group having 1 to 4 carbon atoms, an acetyl group, a hydrogen atom, or an OH group, $R^5$ is a hydrogen atom or an alkyl group having 1 to 4 carbon atoms with or without an OH group, $R^4$ is an alkyl group having 1 to 4 carbon atoms with or without an OH group or

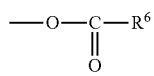

(wherein $R^6$ is an alkyl group having 1 to 4 carbon atoms with or without an OH group), wherein x is an integer equal to or greater than zero and equal to or less than 130, y is an integer equal to or greater than 1 and equal to or less than 40, m', p', n' and q' are independently an integer equal to or greater than zero and equal to or less than 50, wherein at least one of m' or n' is at least 1, and wherein at least one of p' or q' is at least 1.

4. The aqueous solution according to claim 1, wherein the pH of the buffer is about pH 6 to about pH 10.

5. The aqueous solution according to claim 1, wherein $R^1$ is a —$CH_3$ group.

6. The aqueous solution according to claim 1, further comprising a blocking agent.

7. The aqueous solution according to claim 6, wherein the blocking agent is poly-(alkylene oxide) oligomer and/or poly-dimethylacrylamide (p-DMA).

8. The aqueous solution according to claim 7, wherein the poly(alkylene oxide) oligomer comprises the formula of:

[2]

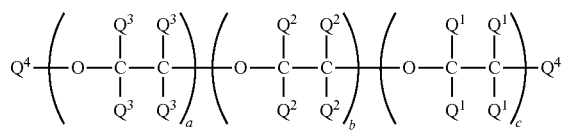

where each $Q^1$ is independently a hydrogen atom or an alkyl group having 1 to 4 carbon atoms, each $Q^2$ is independently a hydrogen atom or an alkyl group having 1 to 4 carbon atoms, each $Q^3$ is independently a hydrogen atom or an alkyl group having 1 to 4 carbon atoms, and each $Q^4$ is independently a hydrogen atom or an —OH group, wherein a is an integer equal to or greater than 1 and equal to or less than 130, b is an integer equal to or greater than 1 and equal to or less than 100, and c is an integer equal to or greater than 1 and equal to or less than 130.

9. The aqueous solution according to claim 8, wherein each $Q^1$ is a hydrogen atom and each $Q^3$ is a hydrogen atom.

10. The aqueous solution according to claim 7, wherein the poly(alkylene oxide) oligomer comprises the formula of:

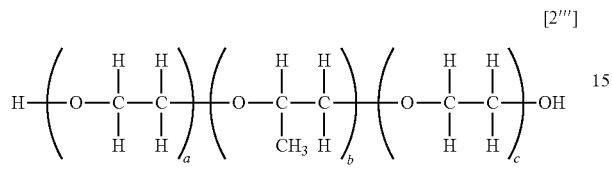
[2′″]

where a=about 99 to about 101 and b=about 56 to about 69, and a=c.

11. The aqueous solution according to claim 7, wherein p-DMA has a number average molecular weight of 50,000 to 450,000 and a weight average molecular weight of 100,000 to 1,200,000.

12. The aqueous solution according to claim 6, wherein the blocking agent is the poly(alkylene oxide) oligomer, wherein the length of the poly(alkylene oxide) oligomer is greater than the length of organosilicone surfactant.

13. The aqueous solution according to claim 1, further comprising at least one component selected from the group consisting of a trailing ion, a leading ion, an analyte, a sample, an analogue, a labeling substance, an antibody, an antigen, a nucleic acid chain, a protein, a charged polymer, a charged substance forming a micelle, and a filler.

14. A method of applying an aqueous solution to a microfluidic channel having hydrophobic surfaces, comprising:
providing the aqueous solution comprising a buffer and an organosilicone surfactant;
applying the aqueous solution to the microfluidic channel having hydrophobic surfaces.

15. The method according to claim 14, wherein the organosilicone surfactant comprises a siloxane group and a polyether group that is bonded to the siloxane group.

16. The method according to claim 14, wherein the organosilicone surfactant comprises the formula of:

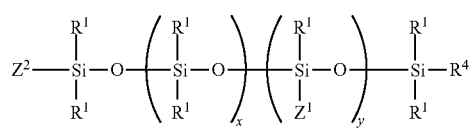

wherein $R^1$ individually is an alkyl group having 1 to 4 carbon atoms with or without an OH group, and $Z^1$ is a hydroxyalkyl group having 1 to 4 carbon atoms or a polyether group, $Z^2$ is an alkyl group having 1 to 4 carbon atoms with or without an OH group or a polyether group, $R^4$ is an alkyl group having 1 to 4 carbon atoms with or without an OH group or

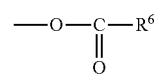

(wherein $R^6$ is an alkyl group having 1 to 4 carbon atoms with or without an OH group), x is an integer equal to or greater than zero and equal to or less than 130, and y is an integer equal to or greater than 1 and equal to or less than 40.

17. The method according to claim 14, wherein the organosilicone surfactant comprises the formula of:

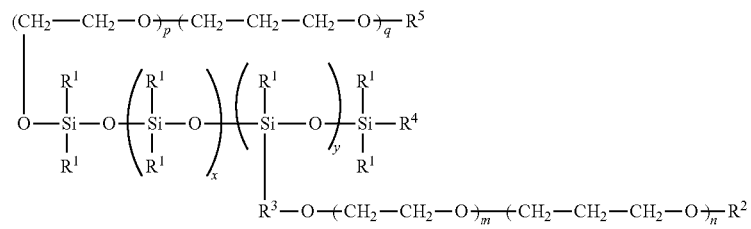

wherein $R^1$ individually is an alkyl group having 1 to 4 carbon atoms with or without an OH group, $R^2$ is an alkyl group, an acetyl group, a hydrogen atom, or an OH group, $R^3$ is an alkylene group, $R^5$ is a hydrogen atom or an alkyl group having 1 to 4 carbon atoms with or without an OH group, $R^4$ is an alkyl group having 1 to 4 carbon atoms with or without an OH group or

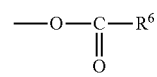

(wherein $R^6$ is an alkyl group having 1 to 4 carbon atoms with or without an OH group), x is an integer equal to or greater than zero and equal to or less than 130, y is an integer equal to or greater than 1 and equal to or less than 40, and m, n, p, and q are independently an integer equal to or greater than zero and equal to or less than 50, wherein at least one of m, n, p or q is at least 1.

18. The method according to claim 14, wherein the organosilicone surfactant comprises the formulae [1] or [1-2] of

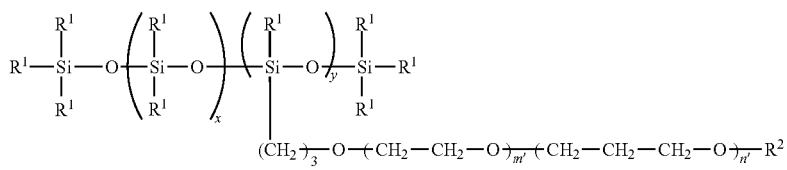

[1]

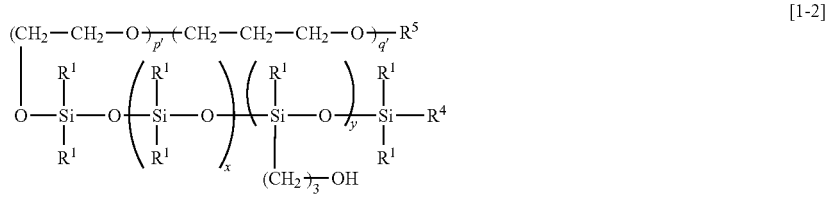

[1-2]

where $R^1$ individually is an alkyl group having 1 to 4 carbon atoms with or without an OH group, $R^2$ is an alkyl group having 1 to 4 carbon atoms, an acetyl group, a hydrogen atom, or an OH group, $R^5$ is a hydrogen atom or an alkyl group having 1 to 4 carbon atoms with or without an OH group, $R^4$ is an alkyl group having 1 to 4 carbon atoms with or without an OH group or

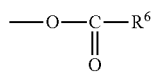

(wherein $R^6$ is an alkyl group having 1 to 4 carbon atoms with or without an OH group), wherein x is an integer equal to or greater than zero and equal to or less than 130, y is an integer equal to or greater than 1 and equal to or less than 40, m', p', n', and q' are independently an integer equal to or greater than zero and equal to or less than 50, wherein at least one of m' or n' are at least 1, and wherein at least one of p' or q' is at least 1.

19. The method according to claim 14, wherein the aqueous solution further comprising a blocking agent, wherein the blocking agent is poly(alkylene oxide) oligomer and/or polydimethylacrylamide (p-DMA).

20. The method according to claim 19, wherein the poly (alkylene oxide) oligomer comprises the formula of:

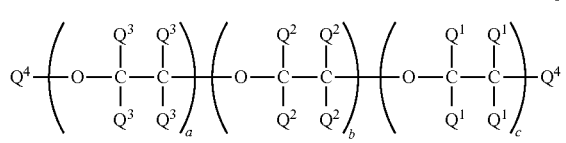

[2]

where each $Q^1$ is independently a hydrogen atom or an alkyl group having 1 to 4 carbon atoms, each $Q^2$ independently is a hydrogen atom or an alkyl group having 1 to 4 carbon atoms, each $Q^3$ independently is a hydrogen atom or an alkyl group having 1 to 4 carbon atoms, and each $Q^4$ is independently a hydrogen atom or an —OH group, wherein a is an integer equal to or greater than 1 and equal to or less than 130, b is an integer equal to or greater than 1 and equal to or less than 100, and c is an integer equal to or greater than 1 and equal to or less than 130.

21. The method according to claim 20, wherein each $Q^1$ is a hydrogen atom and each $Q^3$ is a hydrogen atom.

22. The method according to claim 19, wherein the poly (alkylene oxide) oligomer comprises the formula of:

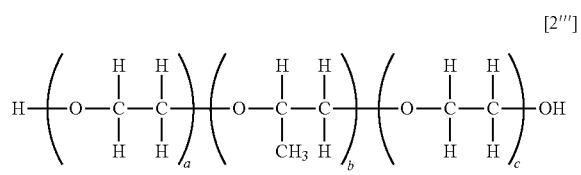

[2''']

where a=about 99 to about 101, b=about 56 to about 69, and a=c.

23. The method according to claim 19, wherein p-DMA has a number average molecular weight of 50,000 to 450,000 and a weight average molecular weight of 100,000 to 1,200,000 or more.

24. The method according to claim 14, wherein the aqueous solution further comprising a blocking agent, wherein the blocking agent is the poly(alkylene oxide) oligomer, such that the length of the poly(alkylene oxide) oligomer is greater than the length of organosilicone surfactant.

25. The method according to claim 14, further comprising: providing in the aqueous solution at least one component selected from the group consisting of a trailing ion, a leading ion, an analyte, a sample, an analogue, a labeling substance, an antibody, an antigen, a nucleic acid chain, a protein, a charged polymer, a charged substance forming a micelle, and a filler.

* * * * *

UNITED STATES PATENT AND TRADEMARK OFFICE
CERTIFICATE OF CORRECTION

PATENT NO. : 8,758,499 B2  
APPLICATION NO. : 12/934636  
DATED : June 24, 2014  
INVENTOR(S) : William W. P. Chang et al.

It is certified that error appears in the above-identified patent and that said Letters Patent is hereby corrected as shown below:

In the Claims

Column 27, line 16 should read

--group, $R^3$ is an alkylene group, $R^5$ is a hydrogen atom or an--

Signed and Sealed this  
Twenty-first Day of October, 2014

Michelle K. Lee  
*Deputy Director of the United States Patent and Trademark Office*